United States Patent
Xu et al.

(10) Patent No.: US 10,745,512 B2
(45) Date of Patent: Aug. 18, 2020

(54) PIEZO-RESISTIVE MATERIALS

(71) Applicant: Nano and Advanced Materials Institute Limited, Hong Kong (CN)

(72) Inventors: Tao Xu, Hong Kong (CN); Li Fu, Hong Kong (CN); Wumaier Xializhati, Hong Kong (CN); Wendan Liu, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 50 days.

(21) Appl. No.: 16/245,338

(22) Filed: Jan. 11, 2019

(65) Prior Publication Data

US 2019/0218333 A1    Jul. 18, 2019

Related U.S. Application Data

(60) Provisional application No. 62/709,287, filed on Jan. 12, 2018.

(51) Int. Cl.

| | |
|---|---|
| *C08G 18/58* | (2006.01) |
| *C08G 18/78* | (2006.01) |
| *C08K 3/04* | (2006.01) |
| *C08L 9/02* | (2006.01) |
| *G01N 27/00* | (2006.01) |
| *G01L 1/18* | (2006.01) |
| *C08L 63/04* | (2006.01) |
| *C08G 18/80* | (2006.01) |
| *C08L 75/00* | (2006.01) |
| *C08G 18/79* | (2006.01) |
| *C08G 18/72* | (2006.01) |
| *C08G 18/73* | (2006.01) |
| *C08G 18/00* | (2006.01) |
| *C08G 18/76* | (2006.01) |

(52) U.S. Cl.
CPC ........... *C08G 18/58* (2013.01); *C08G 18/003* (2013.01); *C08G 18/724* (2013.01); *C08G 18/73* (2013.01); *C08G 18/7621* (2013.01); *C08G 18/7887* (2013.01); *C08G 18/792* (2013.01); *C08G 18/797* (2013.01); *C08G 18/798* (2013.01); *C08G 18/807* (2013.01); *C08G 18/8067* (2013.01); *C08K 3/04* (2013.01); *C08K 3/041* (2017.05); *C08K 3/042* (2017.05); *C08L 9/02* (2013.01); *C08L 63/04* (2013.01); *C08L 75/00* (2013.01); *G01L 1/18* (2013.01); *C08K 2201/001* (2013.01); *C08L 2203/20* (2013.01); *C08L 2312/00* (2013.01)

(58) Field of Classification Search
CPC ........... C08G 18/58; C08G 18/78; C08L 9/02; C08K 3/04; G01N 27/00
USPC ......................................................... 524/424
See application file for complete search history.

(56) References Cited

U.S. PATENT DOCUMENTS

| | | | |
|---|---|---|---|
| 5,989,700 A | 11/1999 | Krivopal | |
| 2012/0258302 A1* | 10/2012 | Hunt | ........................ G01L 1/205 428/300.7 |
| 2018/0163069 A1 | 6/2018 | Wakita | |

FOREIGN PATENT DOCUMENTS

CN            101201277 A      6/2008

* cited by examiner

*Primary Examiner* — Deve V Hall
(74) *Attorney, Agent, or Firm* — Spruson & Ferguson (Hong Kong) Limited

(57) ABSTRACT

The present disclosure provides a pressure sensor composition that includes a crosslinked polymer, a conductive carbon material and an elastomeric rubber, pressure sensors including the same, and methods of preparation and use thereof.

20 Claims, 16 Drawing Sheets

The elasticity of the system was decided by the ratio between hard and soft segments determined by the quantity of the NCO cross-linker End-Blocked (Pyrazole) NCO groups

PIEZO-RESISTIVE MATERIALS

CROSS-REFERENCE TO RELATED APPLICATIONS

This application claims the benefit of priority of U.S. Provisional Application No. 62/709,287, filed on Jan. 12, 2018, the contents of which being hereby incorporated by reference in their entirety for all purposes.

TECHNICAL FIELD

The present disclosure relates to compositions useful in the production of piezo-resistive sensors, methods of production thereof, and pressure sensors comprising the same.

BACKGROUND

There are many applications where a need exists to detect pressure between two contacting surfaces and to provide a pressure profile. Such applications include detecting pressure at contacting surfaces in various industrial equipment for adjustment, testing, and maintenance, in research facilities for measurement and testing of various products, and in medical facilities for measuring and testing, e.g. pressure distribution, dental occlusion and the like. While pressure sensors for some of these applications are typically fabricated as matrix arrays, many of these applications require only single sensors that can provide pressure or force output on the spot.

Flexible, wearable and light-weighted electronics are becoming more and more desirable in human life. Traditional tactile sensors are rigid and in fixed sizes and shapes. In addition, while high-sensitivity sensors can detect and/or measure small pressure changes, their precision and/or sensitivity is severely compromised when the pressure measured goes beyond a certain range, e.g. over several kilograms. In other words, the existing pressure sensors are too rigid for desired flexible and wearable electronics, and can only measure a small range of pressures.

Therefore, there is a need for flexible pressure sensors that can measure a wide range of pressures.

SUMMARY

Provided herein are improved pressure sensor compositions that can readily be prepared from commercially available materials and can exhibit a broad range of pressure sensitivities.

In a first aspect, provided herein is a pressure sensor composition comprising a crosslinked polymer comprising a poly(hexamethylene dicarbamoyl) cross linker and a poly(bisphenol A-co-epichlorohydrin); a conductive carbon material; and an elastomeric rubber.

In a first embodiment of the first aspect, provided herein is the pressure sensor of the first aspect, wherein the conductive carbon material is carbon black, carbon nanotubes, graphene, graphite, or a combination thereof.

In a second embodiment of the first aspect, provided herein is the pressure sensor of the first aspect, wherein the elastomeric rubber comprises polybutadiene, polyisoprene, polyacrylonitrile, and copolymers thereof.

In a third embodiment of the first aspect, provided herein is the pressure sensor of the first aspect, wherein the number average molecular weight of the poly(bisphenol A-co-epichlorohydrin) is about 20,000 amu-about 70,000 amu.

In a fourth embodiment of the first aspect, provided herein is the pressure sensor of the first aspect, wherein the number average molecular weight of poly(hexamethylene dicarbamoyl) is about 500 amu-about 2,500 amu.

In a fifth embodiment of the first aspect, provided herein is the pressure sensor of the first aspect, wherein the pressure sensor composition comprises 90-95% by weight crosslinked polymer, 4-6% by weight conductive carbon material, and 0.5%-2% by weight elastomeric rubber.

In a sixth embodiment of the first aspect, provided herein is the pressure sensor of the fifth embodiment of the first aspect, wherein the crosslinked polymer comprises poly(bisphenol A-co-epichlorohydrin) and poly(hexamethylene dicarbamoyl) cross linker in a mass ratio of 1:2 to 1:3.

In a seventh embodiment of the first aspect, provided herein is the pressure sensor of the fifth embodiment of the first aspect, wherein the number average molecular weight of poly(hexamethylene dicarbamoyl) is about 2,000 amu-about 2,500 amu and the number average molecular weight of the poly(bisphenol A-co-epichlorohydrin) is about 45,000-55,000 amu.

In an eighth embodiment of the first aspect, provided herein is the pressure sensor of the seventh embodiment of the first aspect, wherein the elastomeric rubber is a hydroxyl-terminated butadiene-acrylonitrile copolymer.

In a second aspect, provided herein is a method of preparing the pressure sensor composition of the first aspect, comprising: contacting a blocked poly(hexamethylene diisocyanate); poly(bisphenol A-co-epichlorohydrin); conductive carbon material; and elastomeric rubber thereby forming the pressure sensor of the first aspect.

In a first embodiment of the second aspect, provided herein is the method of the second aspect, wherein the blocked poly(hexamethylene diisocyanate) is blocked with an optionally substituted phenol; an optionally substituted imidazole; or an optionally substituted pyrazole.

In a second embodiment of the second aspect, provided herein is the method of the first embodiment of the second aspect further comprising the step of contacting a poly(hexamethylene diisocyanate) with an optionally substituted phenol; an optionally substituted imidazole; or an optionally substituted pyrazole thereby forming the blocked poly(hexamethylene diisocyanate).

In a third embodiment of the second aspect, provided herein is the method of the second aspect, wherein the number average molecular weight of the poly(bisphenol A-co-epichlorohydrin) is 20,000 amu-70,000 amu.

In a fourth embodiment of the second aspect, provided herein is the method of the second aspect, wherein the number average molecular weight of the blocked poly(hexamethylene diisocyanate) is 500-2,500 amu.

In a fifth embodiment of the second aspect, provided herein is the method of the second aspect, wherein the mass ratio of the poly(bisphenol A-co-epichlorohydrin); the blocked poly(hexamethylene diisocyanate); the conductive carbon material; and the elastomeric rubber is 1:0.4:0.06:0.005 to 1:0.5:0.09:0.015.

In a sixth embodiment of the second aspect, provided herein is the method of the second aspect further comprising the step of curing the pressure sensor composition at a temperature of 110-180° C.

In a seventh embodiment of the second aspect, provided herein is the method of the second aspect, wherein the blocked poly(hexamethylene diisocyanate) is blocked with 3,5-dimethylpyrrazole and the step of contacting the 3,5-dimethylpyrrazole blocked poly(hexamethylene diisocyanate); the poly(bisphenol A-co-epichlorohydrin); the conductive carbon material; and the elastomeric rubber is conducted in the presence of a metal catalyst.

In a third aspect, provided herein is a pressure sensor comprising the pressure sensor composition of the first aspect and an electrode.

In a first embodiment of the third aspect, provided herein is the pressure sensor of the third aspect, wherein the electrode is a flexible silver electrode.

In a first embodiment of the third aspect, provided herein is the pressure sensor of the first embodiment of the third aspect, wherein the flexible silver electrode comprises a poly(hexamethylene dicarbamoyl) cross linker and poly (bisphenol A-co-epichlorohydrin); and silver particles.

The pressure sensor of the present disclosure can exhibit excellent flexibility, stretchability, and sensitivity to the pressure or force applied thereto. In addition, the pressure sensor of the present disclosure can be re-molded with other plastics or rubbers, such as polypropylene (PP), polyethylene (PE), polyethylene terephthalate (PET), ethylene-vinyl acetate (EVA), polyurethane (PU), silicone, and combinations thereof to form application-specific products with good response to a wide range of pressures.

BRIEF DESCRIPTION OF DRAWINGS

It should be understood that the drawings described herein are for illustration purposes only. The drawings are not necessarily to scale, with emphasis generally being placed upon illustrating the principles of the present teachings. The drawings are not intended to limit the scope of the present teachings in any way.

DETAILED DESCRIPTION

Figure 1:
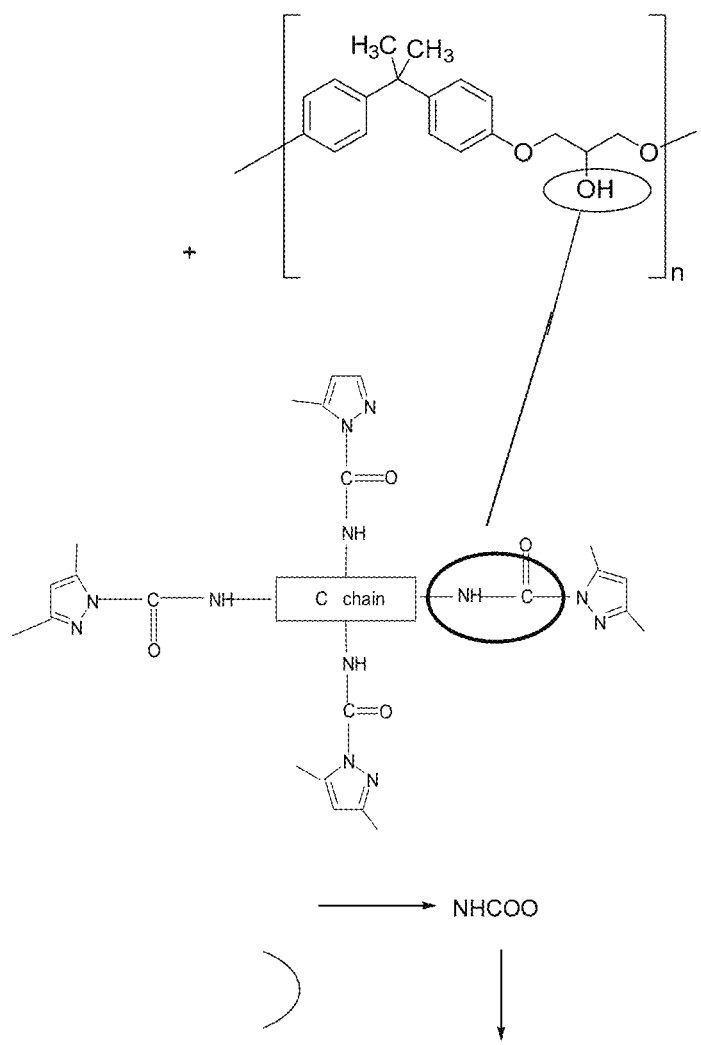
FIG. 1 shows the chemical reaction between a blocked poly(hexamethylene diisocyanate) and poly(bisphenol A-co-epichlorohydrin) that forms the crosslinked polymer comprising a HDI tetra-isocyanate terminated cross linker and poly(bisphenol A-co-epichlorohydrin) according to certain embodiments described herein.

The present disclosure relates to a pressure sensor composition comprising a crosslinked polymer, a conductive carbon material, and an elastomeric rubber.

In certain embodiments, the percentage by weight of the crosslinked polymer relative to the pressure sensor composition can be 90-95%, 90.5-94.5%, 91-94%, 91.5-93.5%, or 92-93%.

In certain embodiments, the percentage by weight of the conductive carbon material relative to the pressure sensor composition can be 4-6%, 4.1-5.9%, 4.2-5.8%, 4.3-5.7%, 4.4-5.6%, 4.5-5.5%, 4.6-5.4%, 4.7-5.3%, 4.8-5.2%, or 4.9-5.1%.

In certain embodiments, the percentage by weight of the elastomeric rubber can be 0.5-2%, 0.6-1.9%, 0.7-1.8%, 0.8-1.7%, 0.9-1.6%, 1.0-1.5%, 1.1-1.4%, or 1.2-1.3%.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of" Unless specified otherwise, all values provided herein include up to and including the endpoints given, and the values of the constituents or components of the compositions are expressed in weight percent or % by weight of each ingredient in the composition.

As used herein, the term "about" when used in connection with a numerical value refers to a range of numerical values ±5% of the specified numerical value. In certain embodiments, "about" when used in connection with a numerical value can refer to the specified numerical value or +5%, +4%, +3, +2%, +1%, −1%, −2%, −3%, −4%, or −5% of the specified numerical value.

The term "carbamoyl" is art-recognized and generally refers to the moiety shown below:

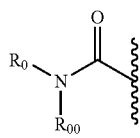

wherein $R_0$ and $R_{00}$ for each instance are independently selected from hydrogen, alkyl, cycloalkyl, heterocycloalkyl, aryl, heteroaryl, alkenyl, and the like. When "carbamoyl" is used in connection with the crosslinked-polymer described herein, it generally refers to the moiety formed by the reaction of an alcohol from the poly(bisphenol A-co-epichlorohydrin) and an isocyanate (or blocked isocyanate) from the cross linker. In such instances, one of $R_0$ or $R_{00}$ can be the remainder of the poly(hexamethylene diisocyanate) cross linker as shown in the exemplary structure shown below:

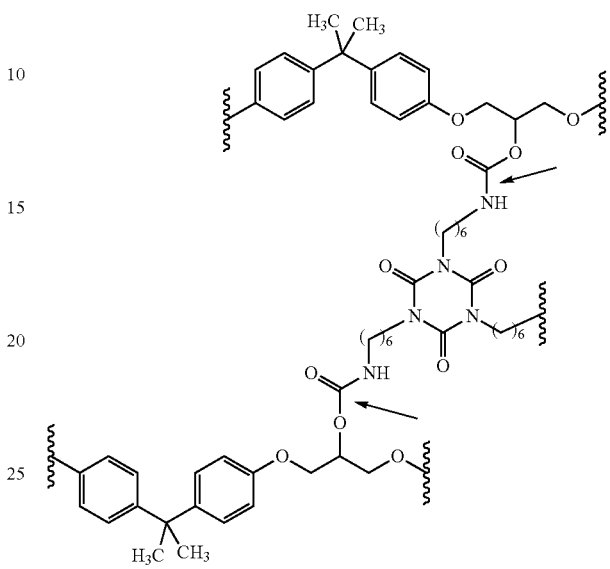

wherein the carbamoyl moieties are indicated by arrows.

The term "optionally substituted" means the anteceding group may be substituted or unsubstituted. When substituted, the substituents of an "optionally substituted" group may include, without limitation, one or more substituents independently selected from the following groups or a particular designated set of groups, alone or in combination: alkyl, alkenyl, alkynyl, alkanoyl, heteroalkyl, heterocycloalkyl, haloalkyl, haloalkenyl, haloalkynyl, perhaloalkyl, perhaloalkoxy, cycloalkyl, phenyl, aryl, aryloxy, alkoxy, haloalkoxy, oxo, acyloxy, carbonyl, carboxyl, alkylcarbonyl, carboxyester, carboxamido, cyano, hydrogen, halogen, hydroxy, amino, alkylamino, arylamino, amido, nitro, thiol, lower alkylthio, arylthio, alkylsulfinyl, alkylsulfonyl, arylsulfinyl, arylsulfonyl, arylthio, sulfonate, sulfonic acid, trisubstituted silyl, $N_3$, SH, $SCH_3$, $C(O)CH_3$, $CO_2CH_3$, $CO_2H$, pyridinyl, thiophene, furanyl, carbamate, and urea. Two substituents may be joined together to form a fused five-, six-, or seven-membered carbocyclic or heterocyclic ring consisting of zero to three heteroatoms, for example forming methylenedioxy or ethylenedioxy.

The crosslinked polymers described herein can be prepared by the reaction of a poly(hexamethylene diisocyanate) and a poly(bisphenol A-co-epichlorohydrin) thereby forming a crosslinked polymer comprising a poly(hexamethylene dicarbamoyl) cross linker and a poly(bisphenol A-co-epichlorohydrin).

In certain embodiments, the poly(hexamethylene diisocyanate) is an oligomeric isocyanate that can be prepared from the reaction of at least three molecules of hexamethylene diisocyanate (HDI). The poly(hexamethylene diisocyanate) can include 2, 3, 4, 5, 6, or more isocyanate groups. In certain embodiments, the poly(hexamethylene diisocyanate) can be one compound or can be a mixture of two or more compounds. In certain embodiments, the poly(hexamethylene diisocyanate) is a mixture of compounds having 2, 3, 4, and 5 isocyanate groups. The poly(hexamethylene diisocyanate) can comprises uretdione, urethane, isocyanurate, allophanate, biuret, iminooxadiazinedione, oxadiazinetrione, and/or linear polymeric structures as shown below:

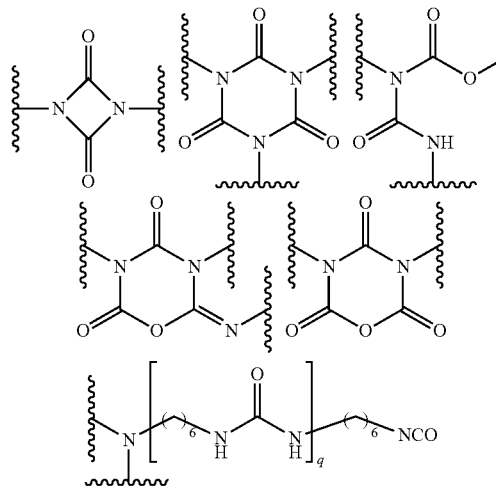

wherein each instance of q is independently a whole number selected between 1 and 10.

In certain embodiments, the poly(hexamethylene diisocyanate) comprise compounds as shown below:

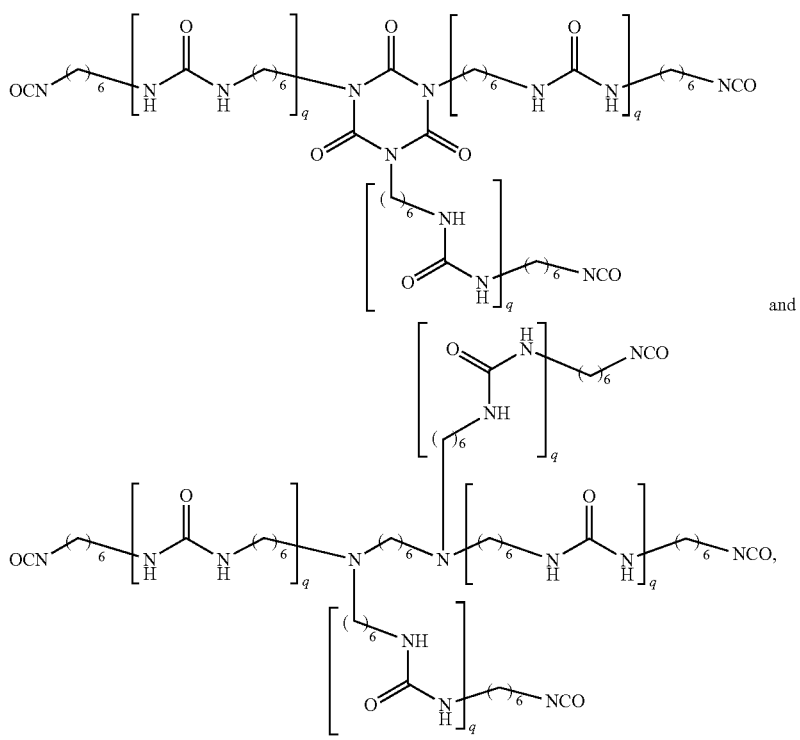

wherein each instance of q is independently a whole number selected between 1 and 10.

In certain embodiments, the poly(hexamethylene diisocyanate) has a Chemical Abstracts Service (CAS) Number: 28182-81-2.

The crosslinked polymer can comprise a poly(hexamethylene dicarbamoyl) cross linker and a poly(bisphenol A-co-epichlorohydrin). The crosslinked polymer can comprise one or more poly(hexamethylene dicarbamoyl)cross linkers. The crosslinked polymer can comprise one or more poly (bisphenol A-co-epichlorohydrin). The number of poly(hexamethylene dicarbamoyl) cross linkers and poly(bisphenol A-co-epichlorohydrin) can be determined, in part, by the stoichiometries of the poly(hexamethylene diisocyanate) and the poly(bisphenol A-co-epichlorohydrin) used to prepare the crosslinked polymer.

In certain embodiments, the number average molecular weight (Mn) of the poly(hexamethylene dicarbamoyl) is about 500-about 2,500 amu; about 1,000-about 2,500 amu; about 1,500-about 2,500 amu; about 1,700-about 2,500 amu; about 1,700-about 2,300 amu; about 1,800-about 2,300 amu; or about 1,800-about 2,200 amu. In certain embodiments, the number average molecular weight (Mn) of the poly (hexamethylene dicarbamoyl) is about 2,000 amu.

The number average molecular weight of the poly(bisphenol A-co-epichlorohydrin) can be about 20,000-about 70,000, 30,000-about 70,000, 30,000-about 60,000, 30,000-about 55,000, 35,000-about 55,000, about 40,000-about 50,000, or about 45,000-about 55,000. In certain embodiments the number average molecular weight of the poly (bisphenol A-co-epichlorohydrin) can be about 50,000 amu.

In certain embodiments, the number average molecular weight poly(hexamethylene dicarbamoyl) is about 1,500-about 2,000 amu and the number average molecular weight of the poly(bisphenol A-co-epichlorohydrin) is about 40,000-about 50,000 amu. In certain embodiments, the number average molecular weight of poly(hexamethylene dicarbamoyl) is about 2,000 amu and the number average molecular weight of the poly(bisphenol A-co-epichlorohydrin) is about 50,000 amu.

The mass ratio between the poly(hexamethylene dicarbamoyl) cross linker and the poly(bisphenol A-co-epichlorohydrin) can be about 1:2 to about 1:3. In certain embodiments, the mass ratio between the poly(hexamethylene dicarbamoyl) cross linker and the poly(bisphenol A-co-epichlorohydrin) can be about 2:5.

Figure 9A:
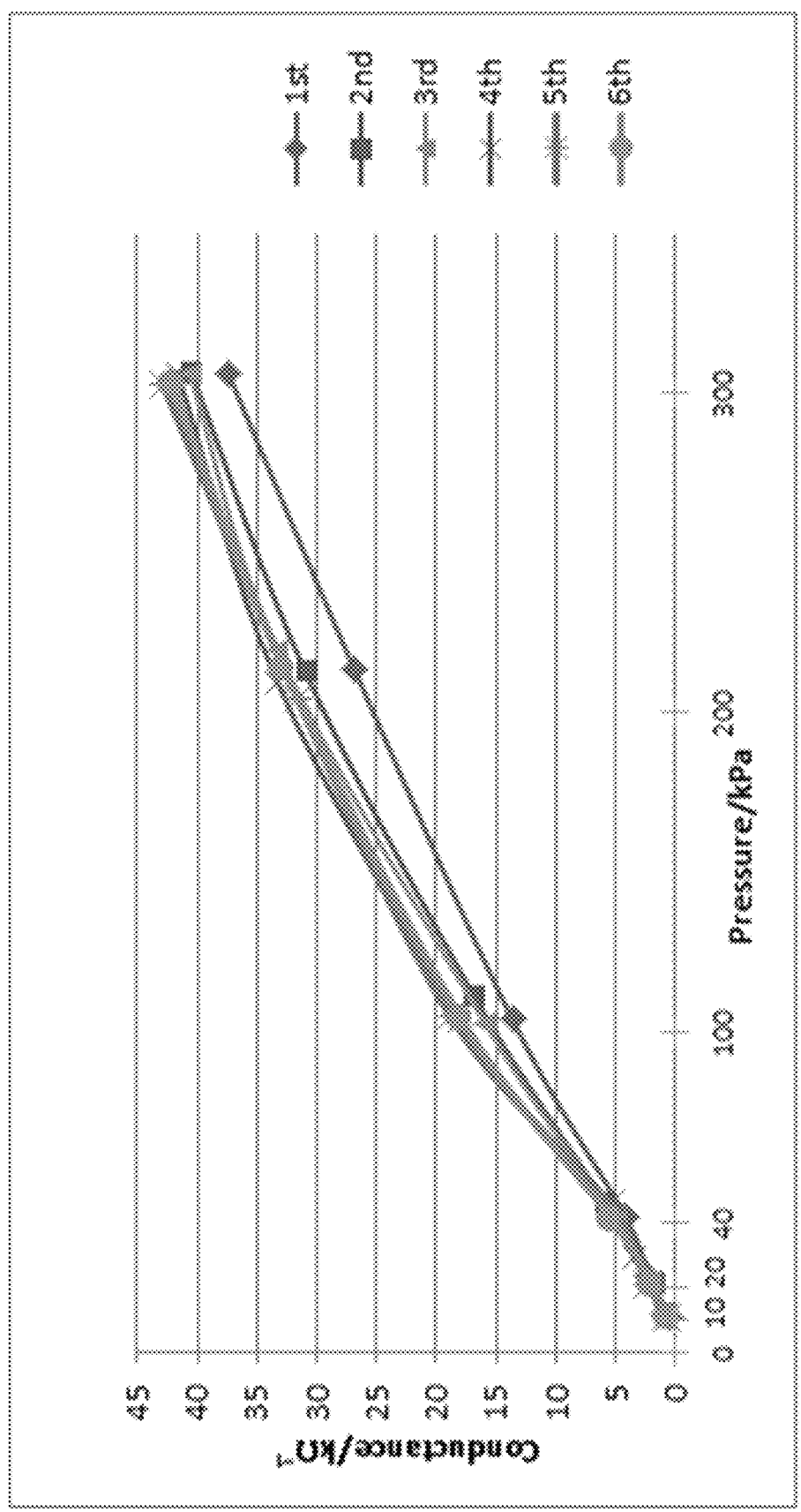
FIG. 9A shows a plot between the conductance and applied pressure on a pressure sensor wherein the carbon material is 3.18 wt. % conductive carbon black powder according to certain embodiments described herein.
Figure 9B:
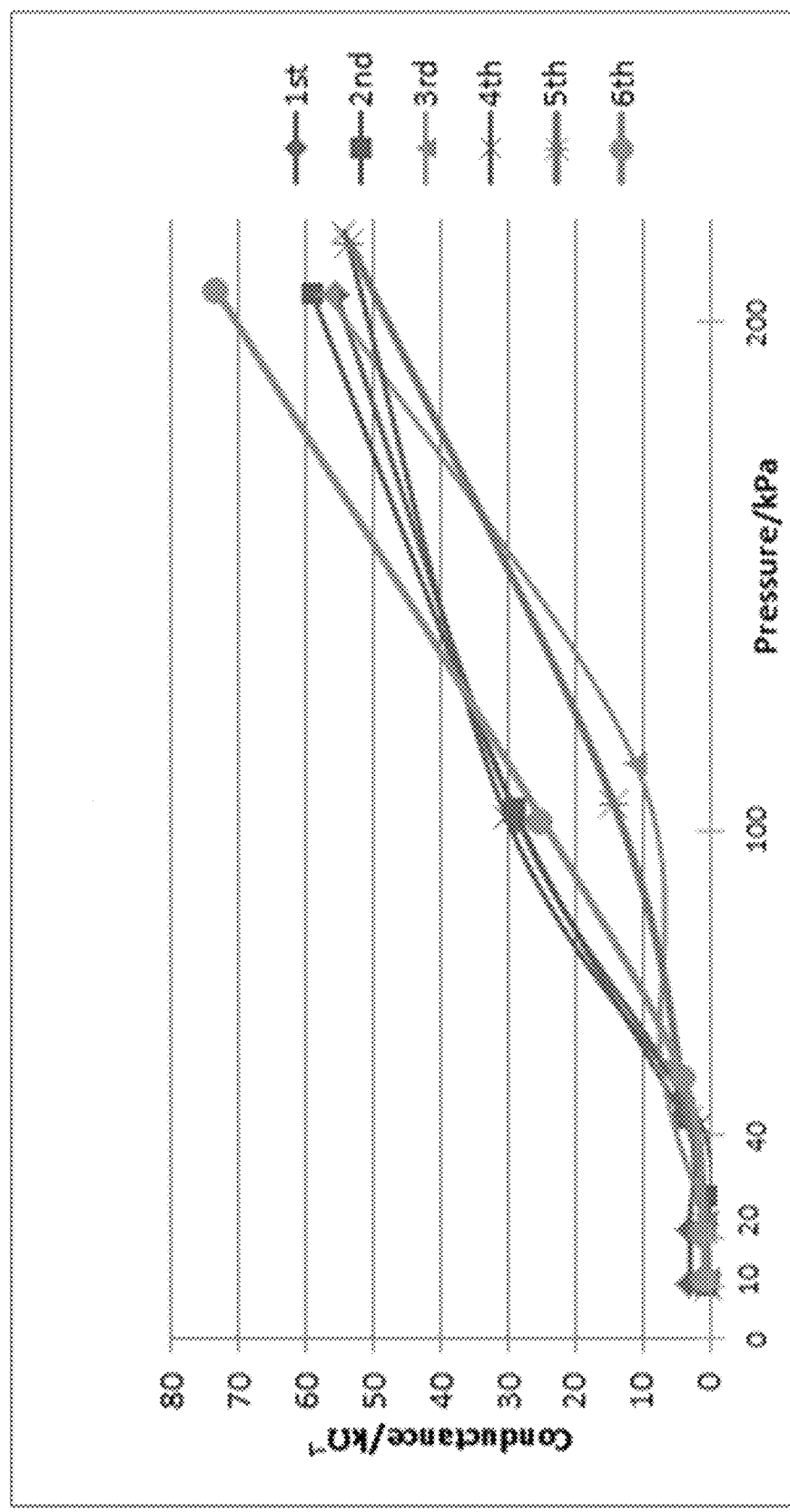
FIG. 9B shows a plot between the conductance and applied pressure on a pressure sensor wherein the carbon material is 3.18 wt. % nongraphitized Black Pearls carbon black spheres with the average size (in reference to the longest dimension of the particle) of 15 nm according to certain embodiments described herein.
Figure 9C:
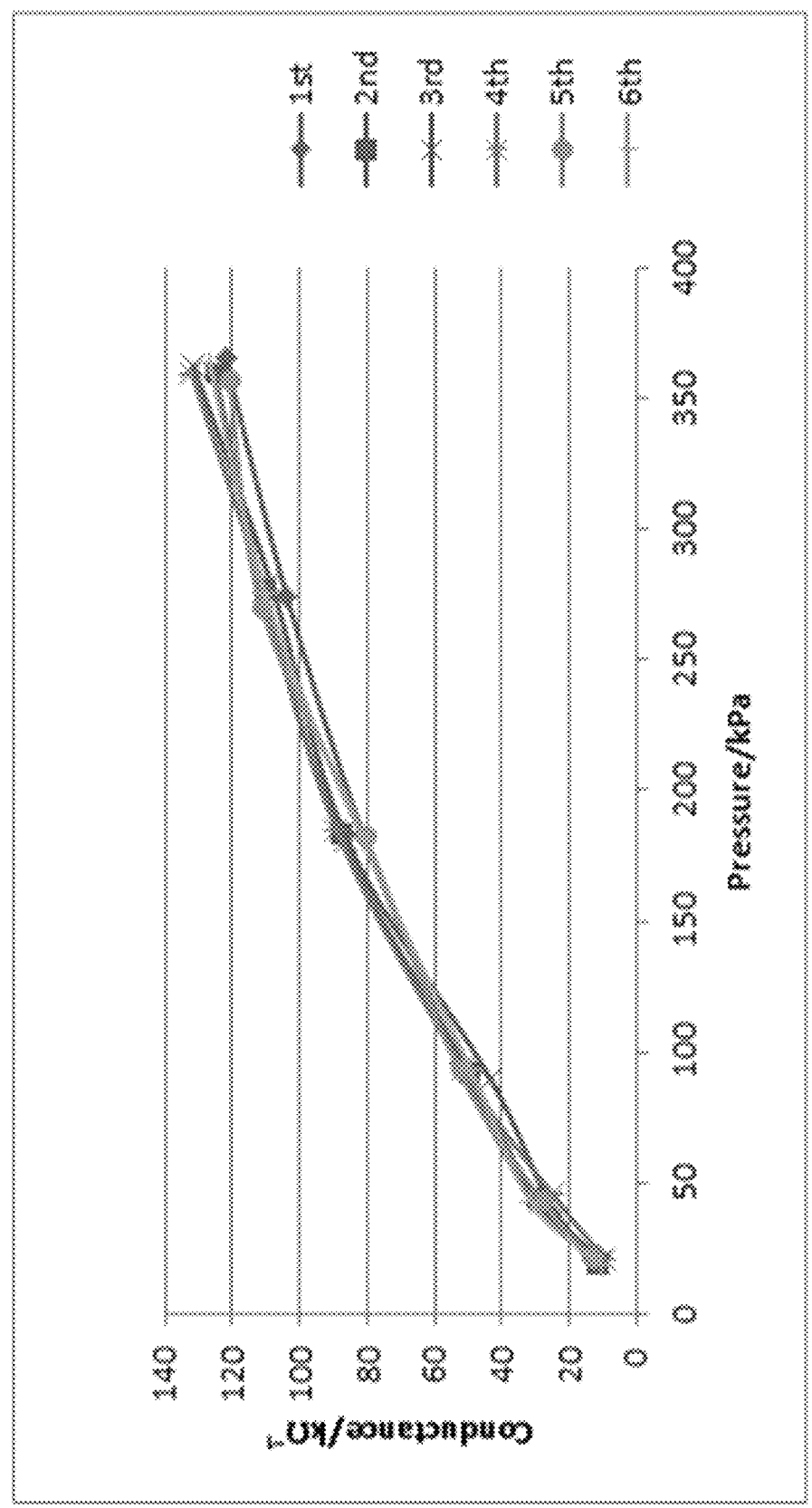
FIG. 9C shows a plot between the conductance and applied pressure on a pressure sensor wherein the carbon material is 3.18 wt. % conductive carbon black powder with the average size of 30 nm according to certain embodiments described herein.
Figure 10A:
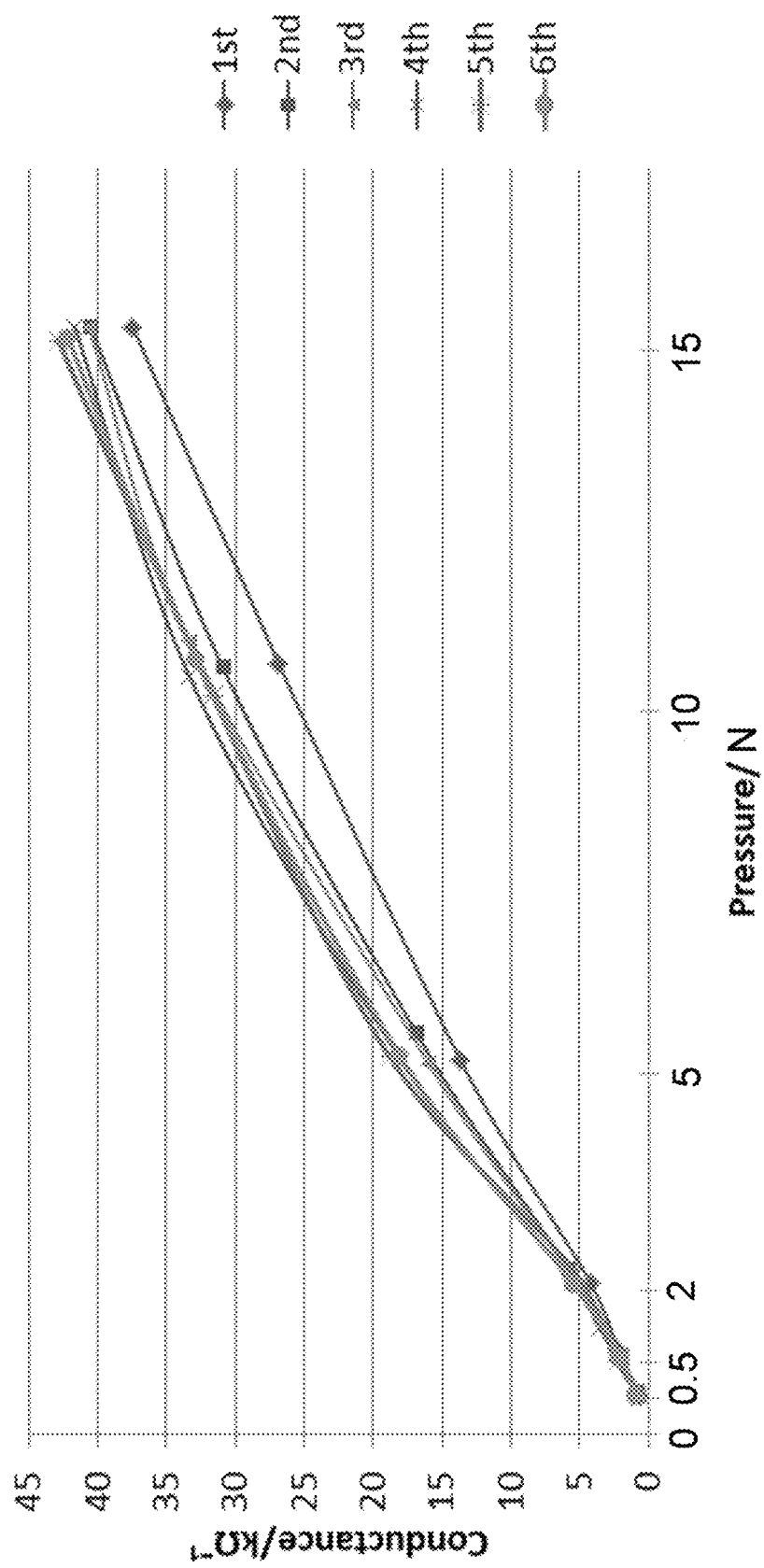
FIG. 10A shows a plot between the conductance and applied pressure on a pressure sensor wherein during the process of making the phenoxy resin is dissolved in 2-butoxyethyl acetate according to certain embodiments described herein.
Figure 10B:
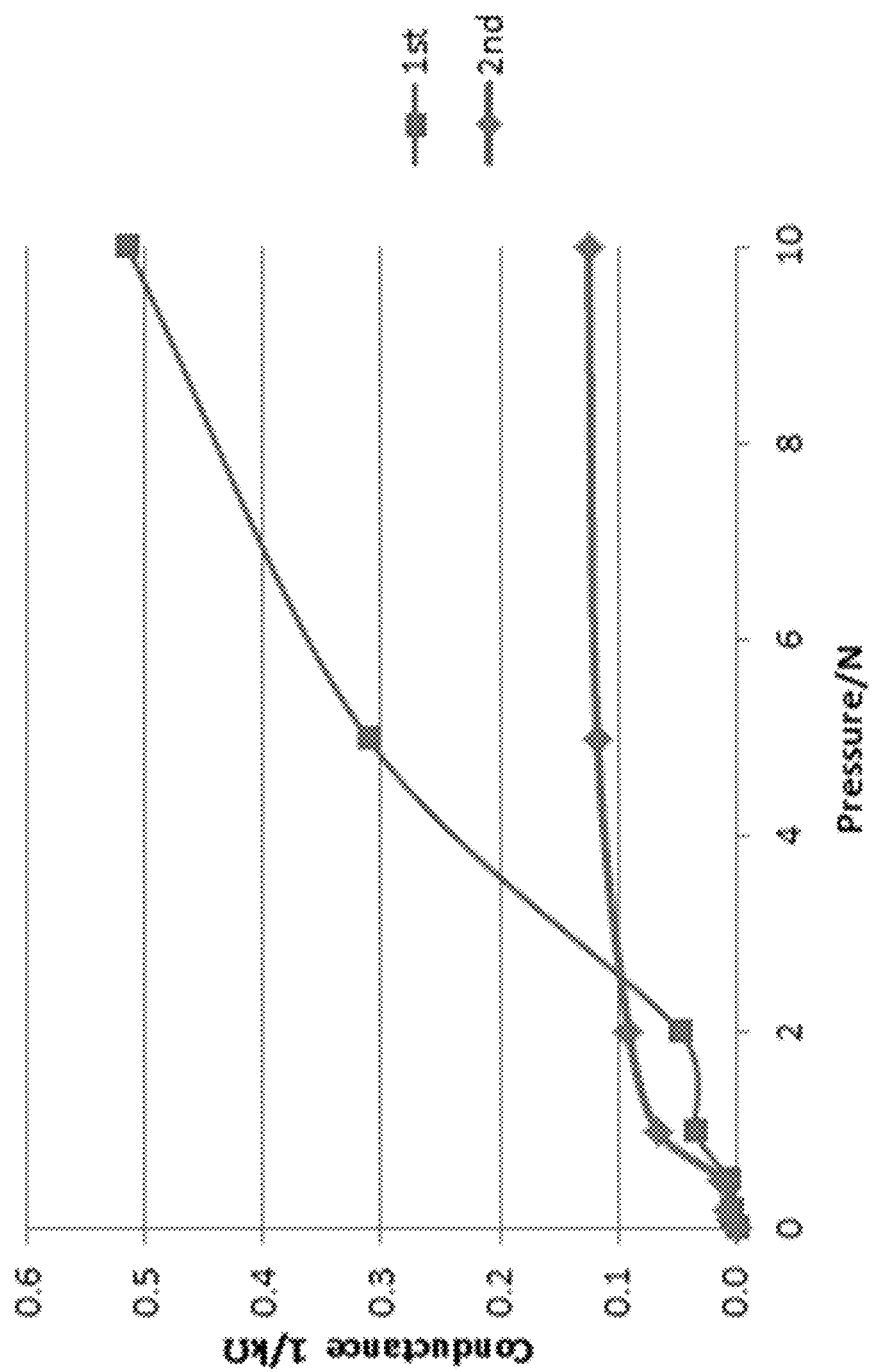
FIG. 10B shows a plot between the conductance and applied pressure on a pressure sensor wherein during the process of making the phenoxy resin is dissolved in 1-methyoxy-2-propanol according to certain embodiments described herein.
Figure 10C:
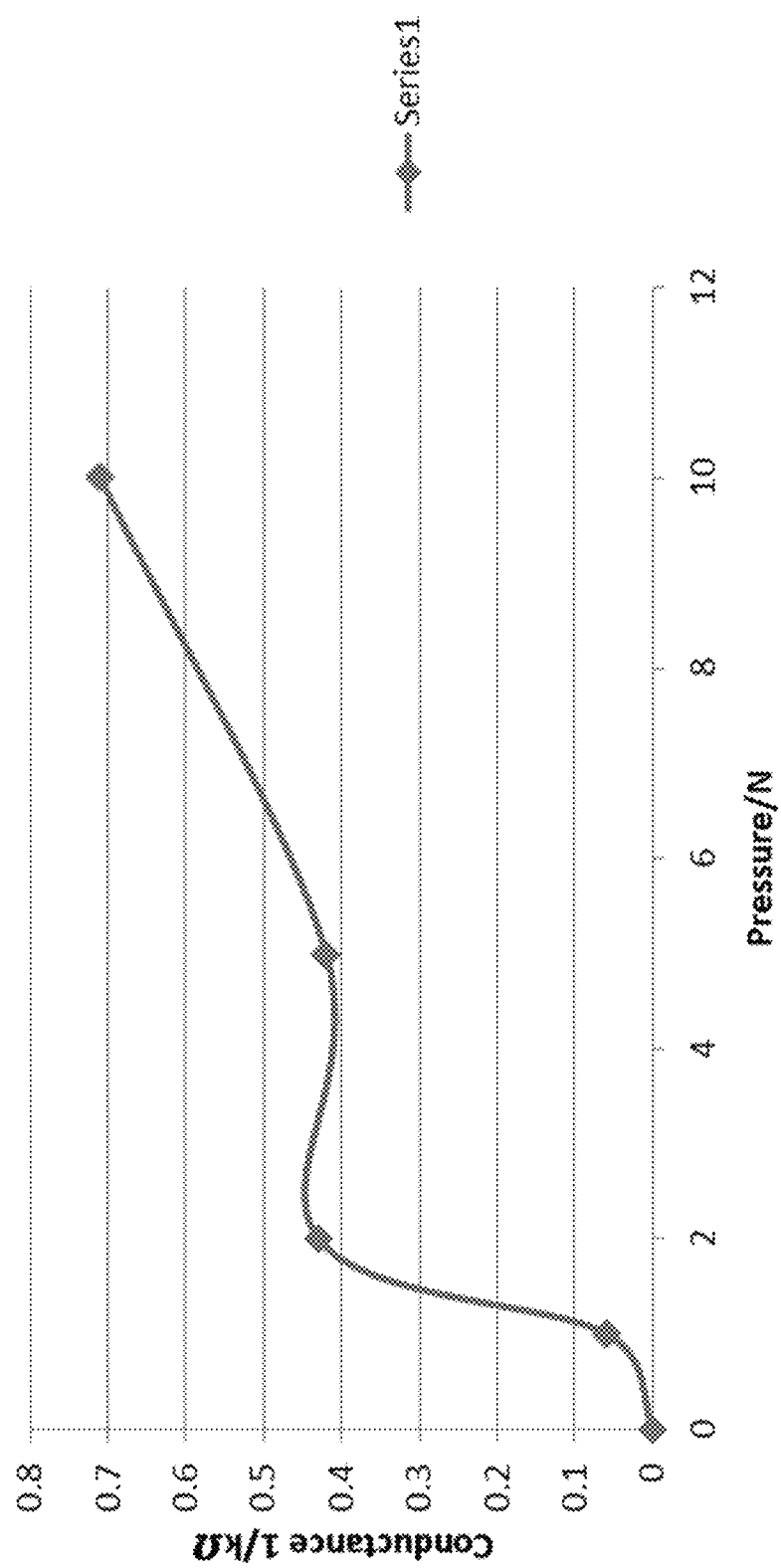
FIG. 10C shows a plot between the conductance and applied pressure on a pressure sensor wherein during the process of making the phenoxy resin is dissolved in ether acetate according to certain embodiments described herein.

The conductive carbon material can be carbon black, carbon nanotubes, graphene, graphite, or a combination thereof. In certain embodiments, the conductive carbon material is carbon black, e.g. conventional carbon black powder, and non-graphitized black pearls carbon black spheres. The average size (in reference to the longest dimension of the particle) of the conductive carbon material can range from 10-300 nm, 15-295 nm, 20-290 nm, 25-285 nm, 30-280 nm, 35-275 nm, 40-270 nm, 45-265 nm, 50-260 nm, 55-255 nm, 60-250 nm, 65-245 nm, 70-240 nm, 75-235 nm, 80-230 nm, 85-225 nm, 90-220 nm, 95-215 nm, 100-210 nm, 105-205 nm, 110-200 nm, 115-195 nm, 120-190 nm, 125-185 nm, 130-180 nm, 135-175 nm, 140-170 nm, 145-165 nm, or 150-160 nm. In certain embodiments, the average size of the conductive carbon material is 155 nm. In certain embodiments, the average size of the conductive carbon material can range from 2 nm to 52 nm, 4 nm to 50 nm, 6 nm to 48 nm, 8 nm to 46 nm, 10 nm to 44 nm, 12 nm to 42 nm, 14 nm to 40 nm, 16 nm to 38 nm, 18 nm to 36 nm, 20 nm to 34 nm, 22 nm to 32 nm, 24 nm to 30 nm, or 26 nm to 28 nm. In certain embodiments, the average size of the conductive carbon material ranges from 15 nm to 40 nm. In certain embodiments, the average size of the conductive carbon material can range from 20 to 50 nm. In certain embodiments, the conductive carbon material is non-graphitized black pearls carbon black sphere with the average size of 15 nm. In certain embodiments, the conductive carbon material is carbon black powder with the average size of 30 nm. As summarized in Table 1 below, when the conductive carbon material is carbon black powder with the average size of 30 nm, the pressure sensor can have a wide range of conductivity in response to different pressures applied thereon and excellent reproducibility after six tests (FIG. 9C). The response range and reproducibility of pressure sensors with conventional conductive carbon black (FIG. 9A), and with non-graphitized black pearls carbon black sphere with the average size of 15 nm (FIG. 9B) are also good. However, when the conductive carbon material is graphite powder with an average size of 40 nm, the resultant pressure sensor has a very small sensing range in response to the pressures applied thereon (FIG. 10C).

TABLE 1

Different types of the conductive carbon material and the resultant pressure sensor made therefrom.

Figure 9D:
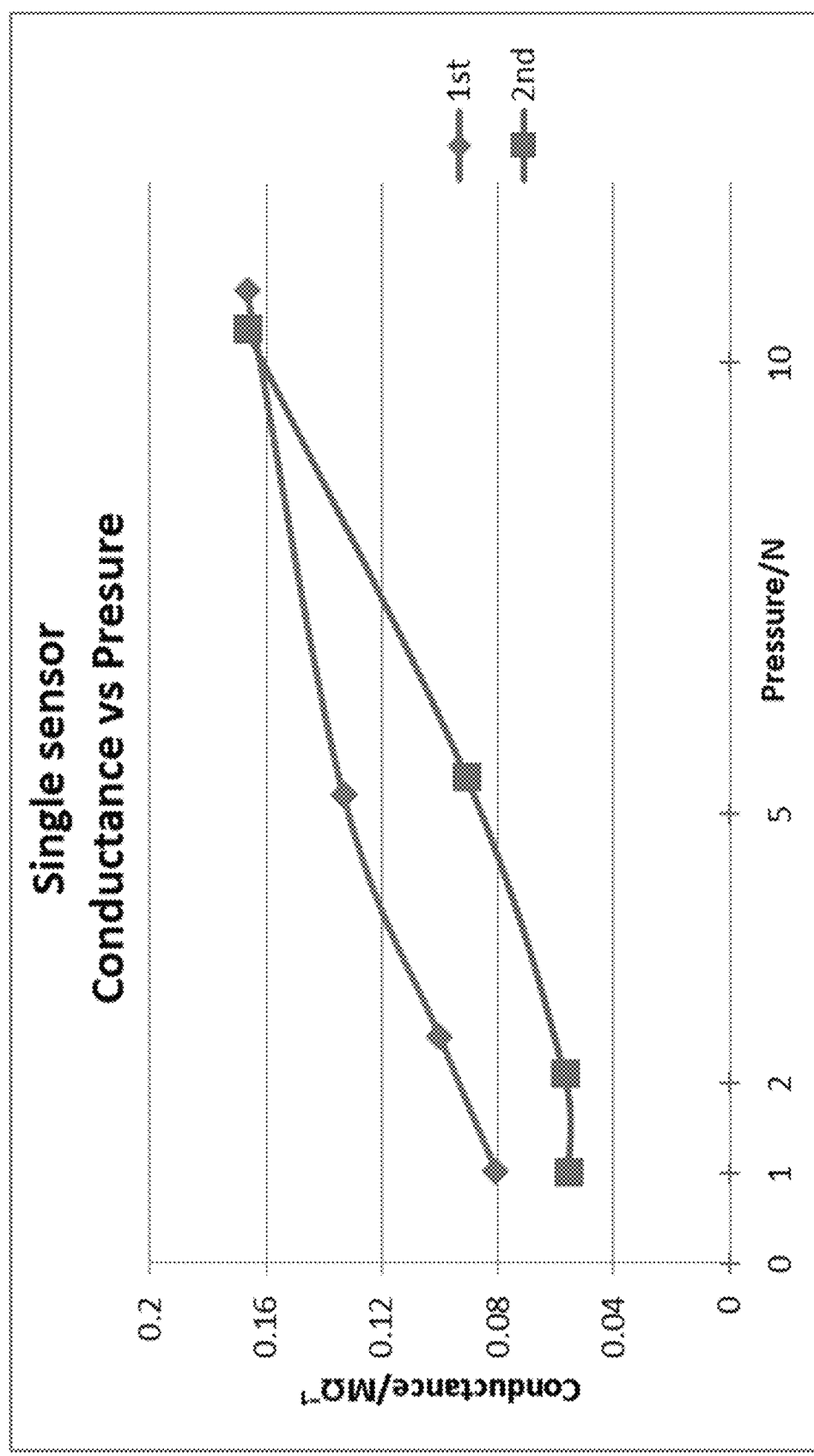
FIG. 9D shows a plot between the conductance and applied pressure on a pressure sensor wherein the carbon material is 3.18 wt. % graphite powder with the average size of 40 nm according to certain embodiments described herein.

| Sample | Binder | Conductive carbon material | wt % of the conductive carbon material | comments |
|---|---|---|---|---|
| 1 (FIG. 9A) | phenoxy | MTI; SuperC45 powder | 3.18% | worked |
| 2 (FIG. 9B) | phenoxy | CABOT; BP2000 sphere, 15 nm | 3.18% | worked |
| 3 (FIG. 9C) | phenoxy | CABOT; VXC-72 powder, 30 nm | 3.18% | worked |
| 4 (FIG. 9D) | phenoxy | Graphite powder, 40 nm | 3.18% | Small sensing range |

Phenoxy is poly(bisphenol A-co-epichlorohydrin) with a number average molecular weight of about 50,000.

"Worked" means the sensor showed continuous resistance response to applied continuous pressure when applied by pressure increases.

The elastomeric rubber can be polybutadiene, polyisoprene, polyacrylonitrile, or copolymers and/or combinations thereof. The elastomeric rubber can make the materials more hydrophobic and/or to increase elasticity. In certain embodiments, the elastomeric rubber is a hydroxyl-terminated butadiene-acrylonitrile copolymer (HTBN) represented by the structure shown below:

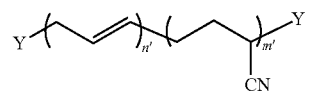

wherein Y is OH; and n' and m' are independently whole numbers between 10-100,000.

The present disclosure also relates to a method of preparing the pressure sensor composition, comprising contacting a blocked crosslinking agent, e.g., a blocked poly(hexamethylene diisocyanate); a phenoxy resin, e.g., poly(bisphenol A-co-epichlorohydrin); conductive carbon material; and elastomeric rubber thereby forming the pressure sensor.

The blocked poly(hexamethylene diisocyanate)) and the poly(bisphenol A-co-epichlorohydrin) can be contacted to form the crosslinked polymer, wherein the blocked poly(hexamethylene diisocyanate) acts as a crosslinking agent. The number average molecular weight of the blocked crosslinking agent can be about 500-about 2,500 amu; about 1,000-about 2,500 amu; about 1,500-about 2,500 amu; about 1,700-about 2,500 amu; about 1,700-about 2,300 amu; about 1,800-about 2,300 amu; or about 1,800-about 2,200 amu. In certain embodiments, the number average molecular weight (Mn) of the blocked poly(hexamethylene diisocyanate) is about 2,000 amu.

Figure 7A:
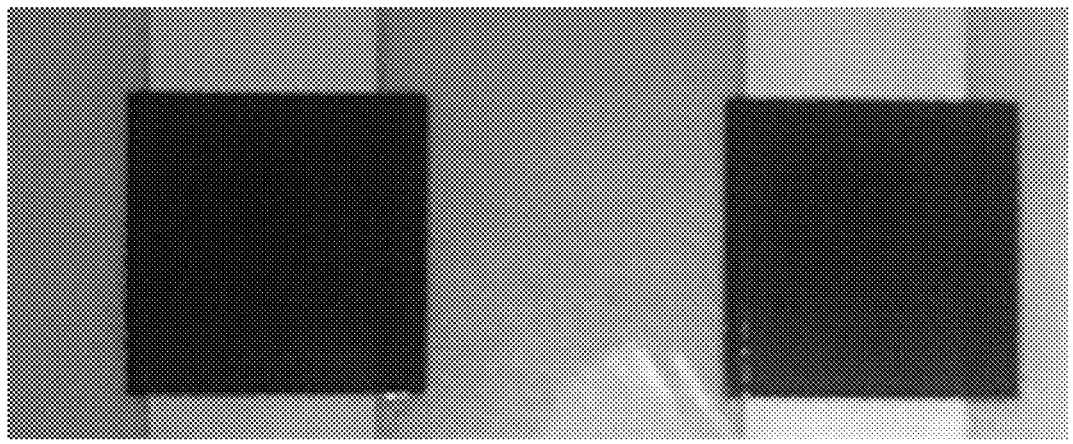
FIG. 7A shows a photographic image of the surface of a pressure sensor wherein the cross linker is blocked tolylene 2,4-diisocyanate terminated poly(propylene glycol) with a molecular weight of 2000, and the resin is made from 37.5 wt. % of blocked tolylene 2,4-dicarbamoyl terminated poly (propylene glycol) cross linker and 62.5 wt. % of poly (bisphenol A-co-epichlorohydrin) according to certain embodiments described herein.
Figure 7B:
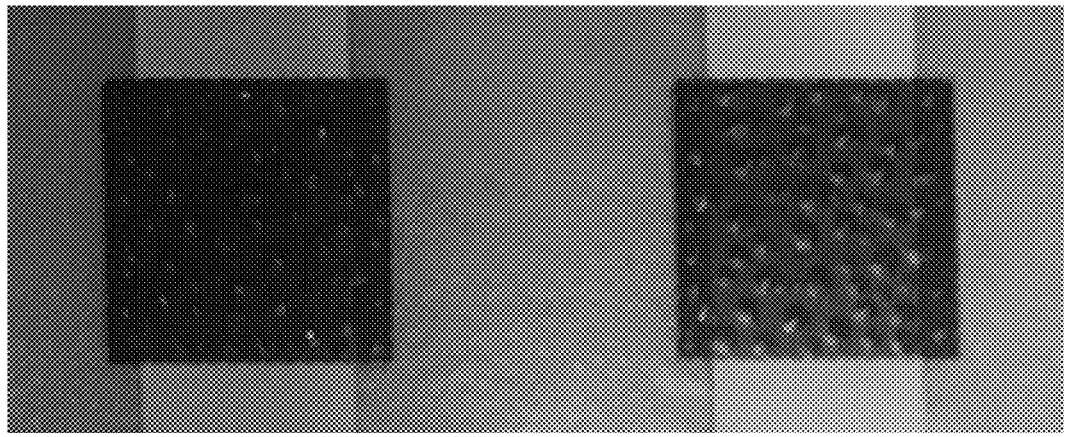
FIG. 7B shows a photographic image of the surface of a pressure sensor wherein the cross linker is 2,4-toluene diisocyanate with a molecular weight of 174, and the resin is 37.5 wt. % of 3,5-dimethylpyrazole blocked poly(hexamethylene diisocyanate) cross linker and 62.5 wt. % of poly(bisphenol A-co-epichlorohydrin) according to certain embodiments described herein.
Figure 7C:
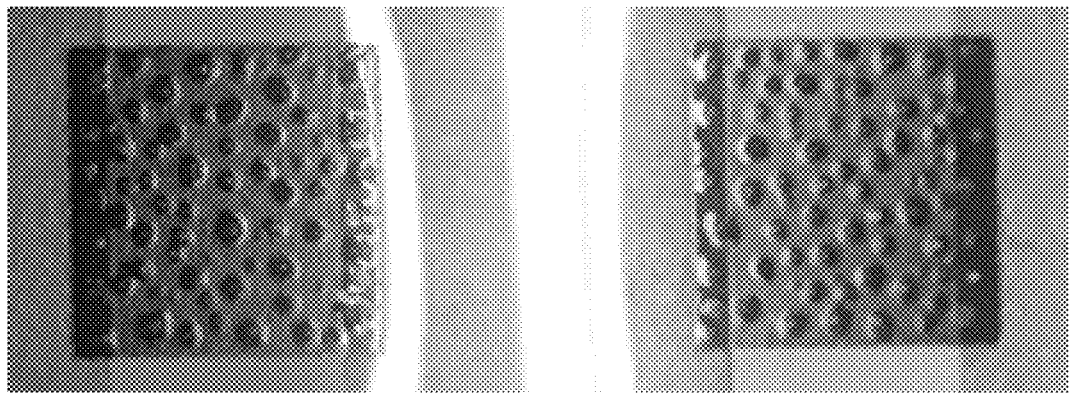
FIG. 7C shows a photographic image of the surface of a pressure sensor wherein the cross linker is hexamethylene diisocyanate with a molecular weight of 168, and the resin is 37.5 wt. % of 3,5-dimethylpyrazole blocked poly(hexamethylene diisocyanate) cross linker and 62.5 wt. % of poly(bisphenol A-co-epichlorohydrin) according to certain embodiments described herein.
Figure 8:
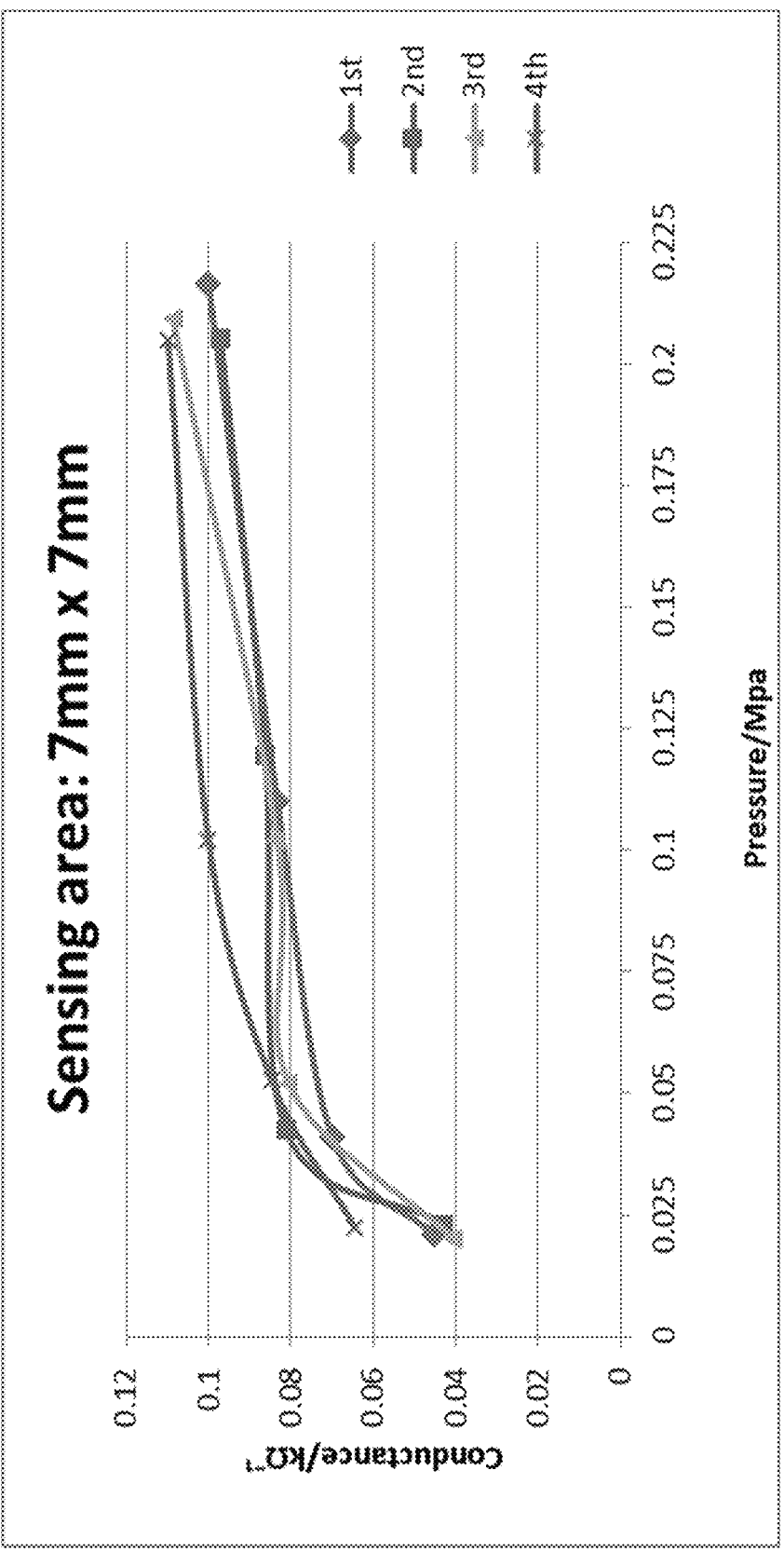
FIG. 8 shows a plot between the conductance and applied pressure on a pressure sensor wherein the cross linker is hexamethylene diisocyanate with a molecular weight of 168 amu, and the resin is made from 37.5 wt. % of hexamethylene diisocyanate and 62.5 wt. % poly(bisphenol A-co-epichlorohydrin).

As shown in Table 2, when the number average molecular weight of the crosslinking agent is about 2000 amu, the surface of the pressure sensor is uniform without bubbles, whereas when low molecular weight diisocyanate crosslinking agents (with a molecular weight of less than 200 amu) were used, the surface of the pressure sensor was not uniform and full of bubbles (FIG. 7A-7C), which can affect the stability, elasticity, and sensitivity of the pressure sensor composition. In other words, the pressure sensor composition prepared using low molecular weight isocyanate can result in a harder and less flexible sensor, and can also result in poor response to pressures applied thereon (as shown by Sample 2 and FIG. 8).

TABLE 2

Different molecular weight of the crosslinking agent and poly(bisphenol A-co-epichlorohydrin), and the resultant pressure sensor made therefrom, the weight percentage of the blocked crosslinking agent relative to the total weight of phenoxy resin is 60%.

| Sample | Crosslinking agent | Number Average Molecular weight (Mn) |
|---|---|---|
| 1 (FIG. 7A) | KL-120 (3,5-dimethylpyrazole blocked poly(hexamethylene diisocyanate)) | 2000 |
| 2 (FIG. 7B) | 2,4-toluene diisocyanate | 174 |
| 3 (FIG. 7C) | hexamethylene diisocyanate | 168 |

Figure 2:
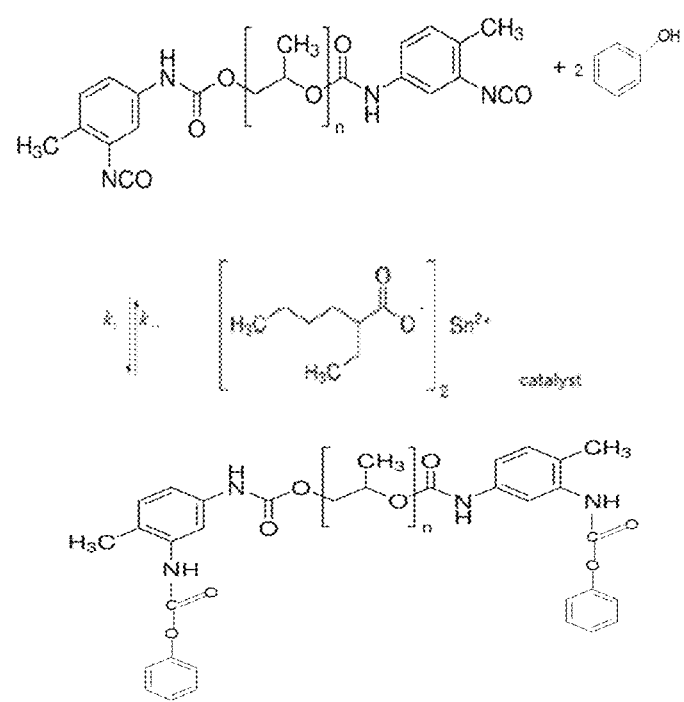
FIG. 2 shows the tin mediated reversible chemical reaction of an exemplary blocking group: phenol and tolylene 2,4-diisocyanate terminated poly(propylene glycol), which forms the blocked tolylene 2,4-diisocyanate terminated poly (propylene glycol) according to certain embodiments described herein.

As shown in FIG. 2, the blocked tolylene 2,4-diisocyanate terminated poly(propylene glycol) can be formed by reacting the tolylene 2,4-diisocyanate terminated poly(propylene glycol) with a blocking agent. The blocking agent can be an optionally substituted phenol; an optionally substituted imidazole; or an optionally substituted pyrazole. In certain embodiments, the blocking agent is an optionally substituted phenol or optionally substituted ketoxime. In certain embodiments, the blocking agent can be alkyl-substituted phenols or ketoximes. In certain embodiments, the blocking agent is phenol, caprolactam, methyl ethyl ketoxime or pyrazole. In certain embodiments, the blocking agent is 3,5-dimethylpyrazole.

The crosslinking agent can be blocked with the blocking agent, so that phenoxy resin, e.g. poly(bisphenol A-co-epichlorohydrin), will not be crosslinked by the crosslinking agent prematurely. The blocking agent can be slightly in excess to ensure complete blocking of the isocyanate groups. In certain embodiments, the weight ratio of the blocked isocyanate cross linker to the of poly(bisphenol A-co-epichlorohydrin) can be about 1:1.1-1:1.3. In certain embodiments, the weight ratio of the blocked isocyanate cross linker to the poly(bisphenol A-co-epichlorohydrin) is about 1:1.2.

The blocking process can be performed in the presence of a catalyst, such as a metal catalyst. In certain embodiments, the catalyst is stannous octoate catalyst. The temperature for the blocking reaction is about 60-80° C. The duration of the blocking reaction is about 2-8 hours. In certain embodiments, the duration of the blocking reaction is about 2-8 hours.

The solvent used for the above-mentioned blocking reaction can be acetone, dimethylformamide (DMF), toluene, ethyl acetate or a mixture thereof. In certain embodiments, the solvent is a mixture of DMF and acetone. In certain embodiments, the weight ratio of the DMF and acetone is 10:1.

In certain embodiments, the blocked poly(hexamethylene diisocyanate) is KL-120™ purchased from Jiangsu Cale New Materials Co., Ltd, which is a mixture of compounds including di-, tri-, tetra, and penta-3,5-dimethylpyrazole blocked poly(hexamethylene diisocyanate)s and having a number average molecular weight of about 2,000 amu.

In certain embodiments, the phenoxy resin is poly(bisphenol A-co-epichlorohydrin). The number average molecular weight of the poly(bisphenol A-co-epichlorohydrin) can be about 20,000-about 70,000, 30,000-about 70,000, 30,000-about 60,000, 30,000-about 55,000, 35,000-about 55,000, about 40,000-about 50,000, or about 45,000-about 55,000. In certain embodiments the number average molecular weight of the poly(bisphenol A-co-epichlorohydrin) can be about 50,000 amu.

In certain embodiments, the phenoxy resin and the crosslinking agent can be present with a molar ratio of NCO/OH from 1:1 to 2:1.

The weight percentage of the blocked poly(hexamethylene diisocyanate) cross linker relative to the total weight of the blocked poly(hexamethylene diisocyanate)cross linker and poly(bisphenol A-co-epichlorohydrin) can be 20-80%, 25-75%, 30-70%, 35-65%, 40-60%, 45-55%, or 50%. In certain embodiments, the weight percentage of the blocked poly(hexamethylene diisocyanate) cross linker relative to the total weight of the blocked poly(hexamethylene diisocyanate) cross linker and poly(bisphenol A-co-epichlorohydrin) is 60%. As shown in FIG. 6A-D and Table 3, the reproducibility and the pressure sensitivity can be improved when the weight percentage of the blocked poly(hexamethylene diisocyanate) cross linker relative to the total weight of the poly(bisphenol A-co-epichlorohydrin) is 60%.

TABLE 3

Different weight percentages of the blocked poly(hexamethylene diisocyanate) crosslinking agent relative to the total weight of the phenoxy resin, and the resistance range of the resultant pressure sensors made therefrom.

| Sample | Blocked pre-polymer crosslinking agent | Cross linker wt % | binder | Resistance range |
|---|---|---|---|---|
| 1 (FIG. 6A) | KL-120 | 40% of binder | Phenoxy resin | 4 kΩ~700 Ω |
| 2 (FIG. 6B) | KL-120 | 50% of binder | Phenoxy resin | 4 kΩ~700 Ω |
| 3 (FIG. 6C) | KL-120 | 60% of binder | Phenoxy resin | 4 kΩ~200 Ω |
| 4 (FIG. 6D) | KL-120 | 65% of binder | Phenoxy resin | 70 kΩ~3 kΩ |

The conductive carbon material can be carbon black, carbon nanotubes, graphene, graphite, or a combination thereof. In certain embodiments, the conductive carbon material is carbon black, e.g. conventional carbon black powder and non-graphitized black pearls carbon black spheres. The average size of the conductive carbon material can range from 10-300 nm, 15-295 nm, 20-290 nm, 25-285 nm, 30-280 nm, 35-275 nm, 40-270 nm, 45-265 nm, 50-260 nm, 55-255 nm, 60-250 nm, 65-245 nm, 70-240 nm, 75-235 nm, 80-230 nm, 85-225 nm, 90-220 nm, 95-215 nm, 100-210 nm, 105-205 nm, 110-200 nm, 115-195 nm, 120-190 nm, 125-185 nm, 130-180 nm, 135-175 nm, 140-170 nm, 145-165 nm, or 150-160 nm. In certain embodiments, the average size of the conductive carbon material is 155 nm. In certain embodiments, the average size of the conductive carbon material can range from 2 nm to 52 nm, 4 nm to 50 nm, 6 nm to 48 nm, 8 nm to 46 nm, 10 nm to 44 nm, 12 nm to 42 nm, 14 nm to 40 nm, 16 nm to 38 nm, 18 nm to 36 nm, 20 nm to 34 nm, 22 nm to 32 nm, 24 nm to 30 nm, or 26 nm to 28 nm. In certain embodiments, the average size of the conductive carbon material ranges from 15 nm to 40 nm. In certain embodiments, the average size of the conductive carbon material can range from 20 to 50 nm. In certain embodiments, the conductive carbon material is non-graphitized black pearls carbon black sphere with the average size of 15 nm. In certain embodiments, the conductive carbon material is carbon black powder with the average size of 30 nm. When the conductive carbon material is carbon black powder with the average size of 30 nm, the pressure sensor has a wide range of conductivity in response to different pressures applied thereon and excellent reproducibility after 6 times of tests (FIG. 9C). The response range and reproducibility of pressure sensors with conventional conductive carbon black (FIG. 9A), and with non-graphitized black pearls carbon black sphere with the average size of 15 nm (FIG. 9B) are also good.

The conductive carbon material can be added with weight percentage relative to the total weight of the starting materials of 2-8%, 2.5-7.5%, 3-7%, 3.5-6.5%, 4-6%, 4.5-5.5%, or 5%. In certain embodiments, the conductive carbon material can be added with weight percentage relative to the total weight of the starting materials of 3-5%, 3.5-4.5%, or 4%. As shown in Table 4, the resistance range of the pressure sensor is good when the weight percentage of the conductive carbon material relative to the total weight of the paste for the pressure sensitive electrode layer is 2.65%-3.15%.

TABLE 4

The weight percentage of the conductive carbon material
and the resistance range of the pressure sensor made therefrom,
wherein the crosslinking agent is a KL-120
(3,5-dimethylpyrazole blocked poly(hexamethylene diisocyanate)),
the phenoxy resin is poly(bisphenol A-co-epichlorohydrin)
having a number average molecular weight of about
50,000 amu, and the weight percentage of the blocked
crosslinking agent relative to the total
weight of the phenoxy resin is 60%.

| Weight percentage of conductive carbon material | Resistance range (at 0.5N~10N) |
| --- | --- |
| 3.60% | 200 Ω-10 Ω; resistance too small |
| 3.15% | 4 kΩ~200 Ω |
| 2.89% | 13 Ω~700 Ω |
| 2.65% | 150 kΩ~6 kΩ |
| 2.50% | 30 MΩ-3 MΩ; barely changes at 5~10N |

The solvent used for the chemical reaction forming the pressure sensor composition can be a high boiling point solvent with low volatility, such as 2-butoxyethyl acetate, 2-methoxyethyl acetate, and combinations thereof. Other solvents can be used in the chemical reaction and are also within the contemplation of the present disclosure. However, solvents, such as 1-methoxy-2-propanol and ethyl acetate may negatively impact the chemical reaction forming the pressure sensor composition and/or the properties of the pressure senor composition, especially for dissolving the phenoxy resin, e.g. poly(bisphenol A-co-epichlorohydrin), as shown in Table 5, FIGS. 10B and 10C, wherein the solvent is 1-methoxy-2-propanol and ethyl acetate, respectively. In contrast, when the solvent for dissolving poly(bisphenol A-co-epichlorohydrin) is 2-butoxyethyl acetate, the resultant pressure sensor demonstrated good pressure sensitivity and reproducibility, as shown in FIG. 10A.

TABLE 5

Different solvents used for dissolving the phenoxy resin
and the resultant pressure sensor made therefrom,
wherein the crosslinking agent is KL-120 (3,5-
dimethylpyrazole blocked poly(hexamethylene diisocyanate)), the
phenoxy resin is poly(bisphenol A-co-epichlorohydrin) having a number
average molecular weight of about 50,000 amu, and the weight
percentage of the blocked crosslinking agent relative to the total
weight of the phenoxy resin is 60%.

| Sample | solvent | binder | Carbon weight, wt % | Comments |
| --- | --- | --- | --- | --- |
| 1 (FIG. 10A) | Ethylene Glycol Monobutyl Ether Acetate | Phenoxy resin | 3.18% | worked |
| 2 (FIG. 10B) | 1-Methoxy-2-propanol | Phenoxy resin | 4.14% | didn't work |
| 3 (FIG. 10C) | Ethyl Acetate | Phenoxy resin | 4.64% | Easily volatile, layering |

Such solvent can be used to prepare phenoxy resin solution and rubber solution. For the phenoxy resin solution, the weight percentage of the solvent can be 25-40%, 25.5-39.5%, 26-39%, 26.5-38.5%, 27-38%, 27.5-37.5%, 28-37%, 28.5-36.5%, 29-36%, 29.5-35.5%, 30-35%, 30.5-34.5%, 31-34%, 31.5-33.5%, 32-33%, or 32.5%. For the rubber solution, the weight percentage of the solvent can be 40-55%, 40.5-54.5%, 41-54%, 41.5-53.5%, 42-53%, 42.5-52.5%, 43-52%, 43.5-51.5%, 44-51%, 44.5-50.5%, 45-50%, 45.5-49.5%, 46-49%, 46.5-48.5%, 47-48%, or 47.5%.

The pressure sensor composition of the present disclosure can be prepared by mixing the phenoxy resin, the blocked crosslinking agent, the conductive carbon material, and the liquid rubber solution, followed by curing at a temperature of about 110° C.-about 180° C., about 115° C.-about 175° C., about 120° C.-about 170° C., about 125° C.-about 165° C., about 130° C.-about 160° C., about 135° C.-about 155° C., about 140° C.-about 150° C., or about 145° C. for a period of about 10 min-about 60 min, about 15 min-about 55 min, about 20 min-about 50 min, about 25 min-about 45 min, about 30 min-about 40 min, or about 35 min. In certain embodiments, the curing temperature is about 150° C. and the curing time is about 20 min.

In certain embodiments, the mass ratio of the poly(bisphenol A-co-epichlorohydrin); the blocked poly(hexamethylene diisocyanate); the conductive carbon material; and the elastomeric rubber is 1:0.4:0.06:0.005 to 1:0.5:0.09:0.015.

The present disclosure further relates to a pressure sensor comprising the pressure sensor composition and an electrode. The electrode can comprise a crosslinked polymer, a conductive material, e.g., silver, and surfactant additive, such as sodium dodecylbenzenesulfonate (SDBS). The crosslinked polymer of the electrode can comprise a poly(hexamethylene dicarbamoyl)cross linker and a poly(bisphenol A-co-epichlorohydrin). The crosslinked polymer can comprise one or more poly(hexamethylene dicarbamoyl) cross linkers. The crosslinked polymer can comprise one or more poly(bisphenol A-co-epichlorohydrin). The number of poly(hexamethylene dicarbamoyl) cross linkers and poly(bisphenol A-co-epichlorohydrin)s in the cross linked polymer can be determined, in part, by the stoichiometries of the poly(hexamethylene diisocyanate) and the poly(bisphenol A-co-epichlorohydrin) used to prepare the crosslinked polymer.

In certain embodiments, the number average molecular weight (Mn) of the poly(hexamethylene dicarbamoyl) cross linker is about 500-about 2,500 amu; about 1,000-about 2,500 amu; about 1,500-about 2,500 amu; about 1,700-about 2,500 amu; about 1,700-about 2,300 amu; about 1,800-about 2,300 amu; or about 1,800-about 2,200 amu. In certain embodiments, the number average molecular weight (Mn) of the poly(hexamethylene dicarbamoyl) is about 2,000 amu.

The number average molecular weight of the poly(bisphenol A-co-epichlorohydrin) can be about 20,000-about 70,000, 30,000-about 70,000, 30,000-about 60,000, 30,000-about 55,000, 35,000-about 55,000, about 40,000-about 50,000, or about 45,000-about 55,000. In certain embodiments the number average molecular weight of the poly(bisphenol A-co-epichlorohydrin) can be about 50,000 amu.

In certain embodiments, the number average molecular weight of poly(hexamethylene dicarbamoyl) cross linker is about 1,500-about 2,500 amu and the number average molecular weight of the poly(bisphenol A-co-epichlorohydrin) is about 40,000-about 50,000 amu. In certain embodiments, the number average molecular weight of the poly(hexamethylene dicarbamoyl) cross linker is about 2,000 amu and the number average molecular weight of the poly(bisphenol A-co-epichlorohydrin) is about 50,000 amu.

The mass ratio between the poly(hexamethylene dicarbamoyl) cross linker and the poly(bisphenol A-co-epichlorohydrin) can be 1:1 to 1:3. In certain embodiments, the mass ratio between the poly(hexamethylene dicarbamoyl)) cross linker and the poly(bisphenol A-co-epichlorohydrin) can be 1:2.

In certain embodiments, the mass ratio of the blocked poly(hexamethylene diisocyanate); the poly(bisphenol A-co-epichlorohydrin); and the conductive material is about 1:1:4 to about 1:3:5.

The pressure sensor composition forms a pressure sensitive electrode layer, and the electrode forms a conductive electrode layer. The conductive electrode layer is formed from a paste that is prepared by mixing the phenoxy resin, the blocked crosslinking agent, the conductive powder, 2-butoxyethyl acetate solvent and surfactant additives. The conductive powder can be micro-sized silver particles, and any other suitable conductive powder is also within the contemplation of the present disclosure. The paste can be screen printed onto substrates, such as polyethylene terephthalate (PET) or polyimide (PI), polyester, nylon and natural fiber fabrics, to form the conductive layer. The paste for the pressure sensor composition prepared by mixing the phenoxy resin, e.g. poly(bisphenol A-co-epichlorohydrin), the blocked crosslinking agent, e.g. the poly(hexamethylene diisocyanate), the conductive carbon material, and liquid rubber solution, is subsequently printed onto the conductive layer that was previously printed on the substrate, e.g. polyethylene terephthalate (PET) or polyimide (PI), polyester, nylon and natural fiber fabric, to form the pressure sensitive layer.

The printed pressure sensitive layer and conductive layer can be subsequently cured at a temperature of about 120° C.-about 200° C., about 125° C.-about 195° C., about 130° C.-about 190° C., about 135° C.-about 185° C., about 140° C.-about 180° C., about 145° C.-about 175° C., about 150° C.-about 170° C., about 155° C.-about 165° C., or about 160° C. In certain embodiments, the printed pressure sensitive layer and conductive layer are cured at a temperature of about 140° C.-about 180° C., about 145° C.-about 175° C., about 150° C.-about 170° C., about 155° C.-about 165° C., or about 160° C. to form the pressure sensitive electrode layer and the conductive electrode layer, respectively. Without wishing to be bound by theory, it is believed that during the curing process, the blocked crosslinking agent including the isocyanate groups are unblocked, so that the in situ polymerization between the exposed isocyanate groups of the crosslinking agent and the hydroxyl groups of the phenoxy resin occurs. The pattern of the pressure sensor can be designed based on the requirement of applications.

The weight percentage of phenoxy resin in the paste, including solvent, for the pressure sensitive layer can be 55-70%, 56-69%, 57-68%, 58-67%, 59-66%, 60-65%, 61-64%, or 62-63%. In certain embodiments, the weight percentage of phenoxy resin in the paste for the pressure sensitive layer can be 65-70%, 66-69%, or 67-68%.

Figure 3A:
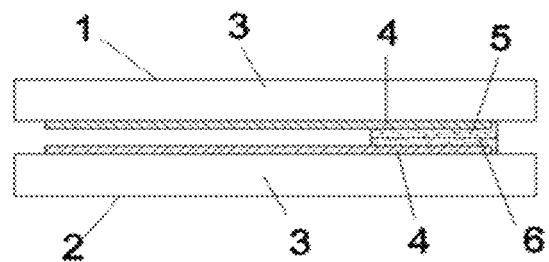
FIG. 3A shows a cross-section view of the pressure sensor according to certain embodiments described herein.
Figure 3B:
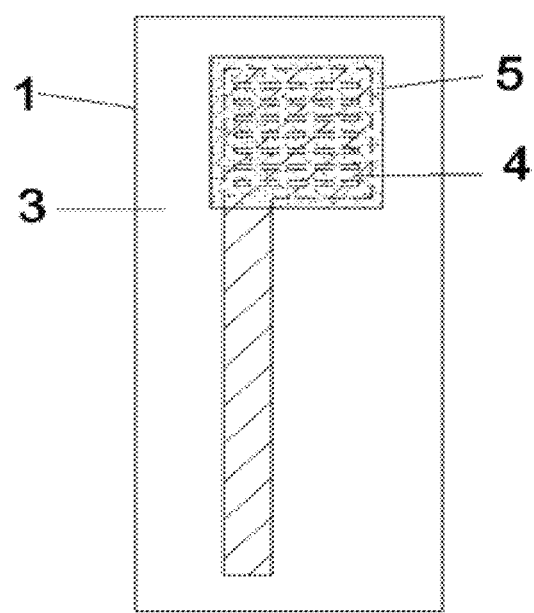
FIG. 3B shows a plan view of the upper electrode of the pressure sensor according to certain embodiments described herein.
Figure 4A:
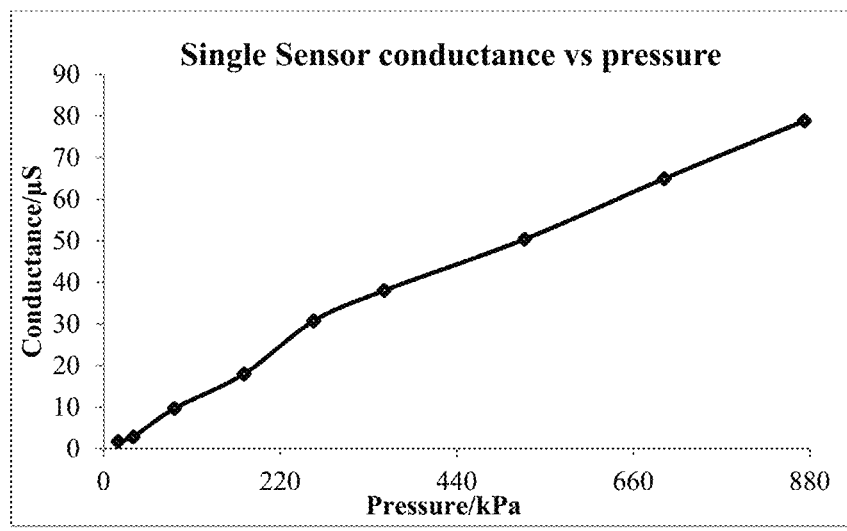
FIG. 4A shows a plot between the conductance and applied pressure (17.7 kPa to 880 kPa) on an exemplary pressure sensor according to certain embodiments described herein.
Figure 4B:
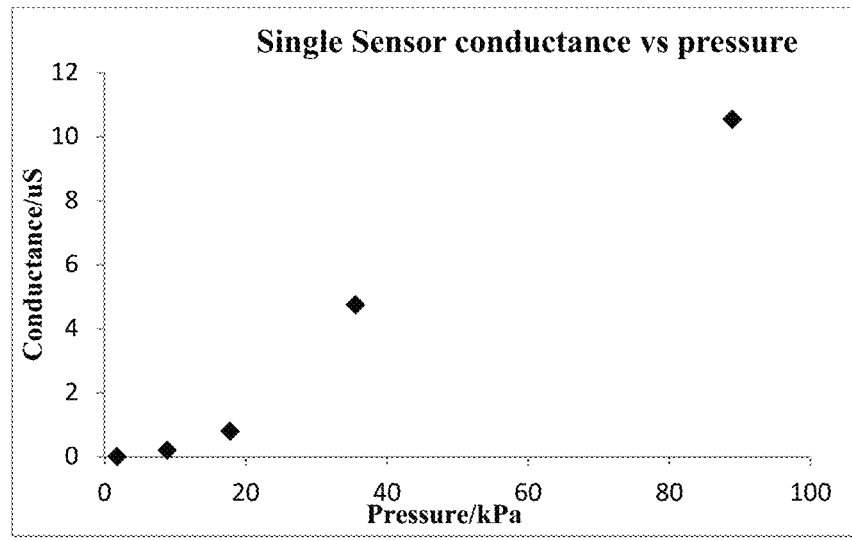
FIG. 4B shows a plot between the conductance and applied pressure (1.78 kPa to 88 kPa) on a pressure sensor according to certain embodiments described herein.

The configuration of a single pressure sensor is illustrated in FIGS. 3A and 3B. As shown in FIG. 3A, the single pressure sensor can comprise an upper electrode 1 and a lower electrode 2. As shown in FIGS. 3A and 3B, each of the upper electrode 1 and the lower electrode 2 can comprise a conductive electrode layer 4 and pressure sensitive electrode layer 5 and 6. The conductive electrode layer 4 was screen-printed on PET substrate 3. The pressure sensitive electrode layer 5 and 6 was printed on the conductive electrode layer 4. The conductance of the single pressure sensor was positively correlated with the pressure applied onto the single pressure sensor. The conductance of the single pressure sensor changed from around 1.8 μS to around 88 μS when the pressure applied ranges from about 17 kPa to about 880 kPa (1~50N) (FIG. 4A). The single pressure sensor of the present disclosure can detect small pressures applied, such as from about 1.78 kPa (0.1N) to about 88 kPa, as shown in FIG. 4B.

Figure 5A:
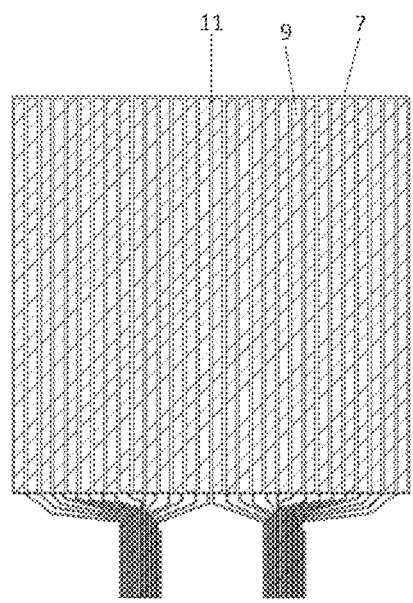
FIG. 5A shows a plan view of the upper electrode of a pressure sensor array of 30×30 pressure sensors according to certain embodiments described herein.
Figure 5B:
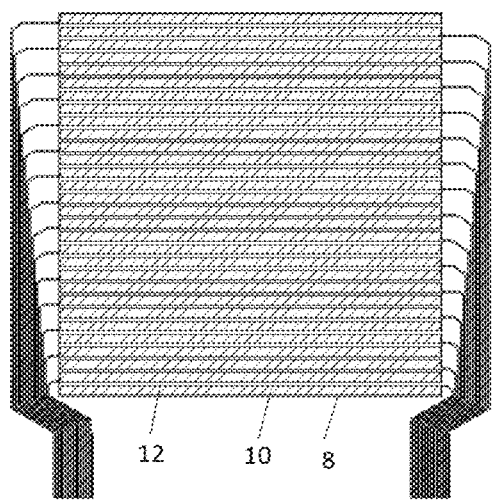
FIG. 5B shows a plan view of the lower electrode of a pressure sensor array of 30×30 pressure sensors according to certain embodiments described herein.
Figure 6A:
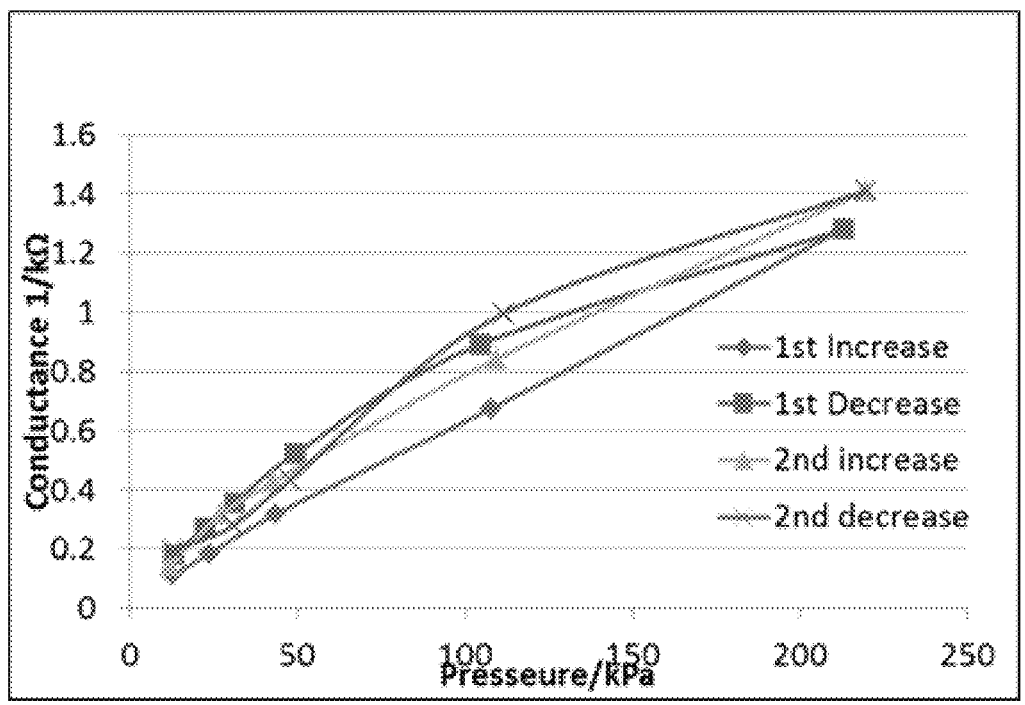
FIG. 6A shows a plot between the conductance and applied pressure on a pressure sensor made from 40 wt. % of 3,5-dimethylpyrazole blocked poly(hexamethylene diisocyanate) cross linker and 60 wt. % of poly(bisphenol A-co-epichlorohydrin) according to certain embodiments described herein.
Figure 6B:
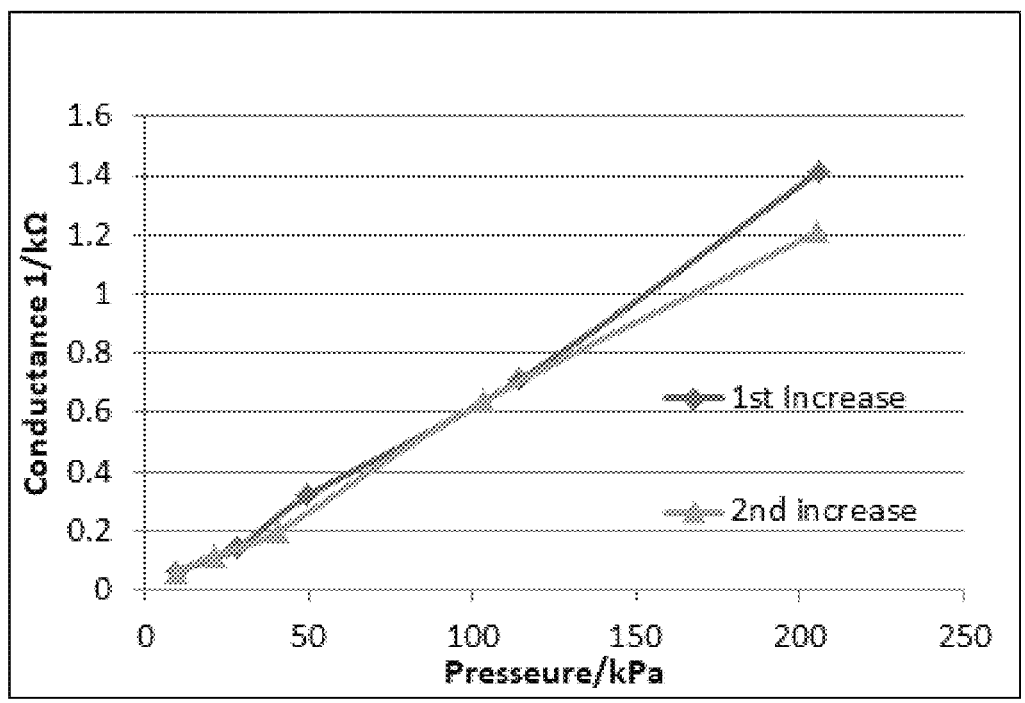
FIG. 6B shows a plot between the conductance and applied pressure on a pressure sensor made from 50 wt. % of 3,5-dimethylpyrazole blocked poly(hexamethylene diisocyanate) cross linker and 50 wt. % of poly(bisphenol A-co-epichlorohydrin) according to certain embodiments described herein.
Figure 6C:
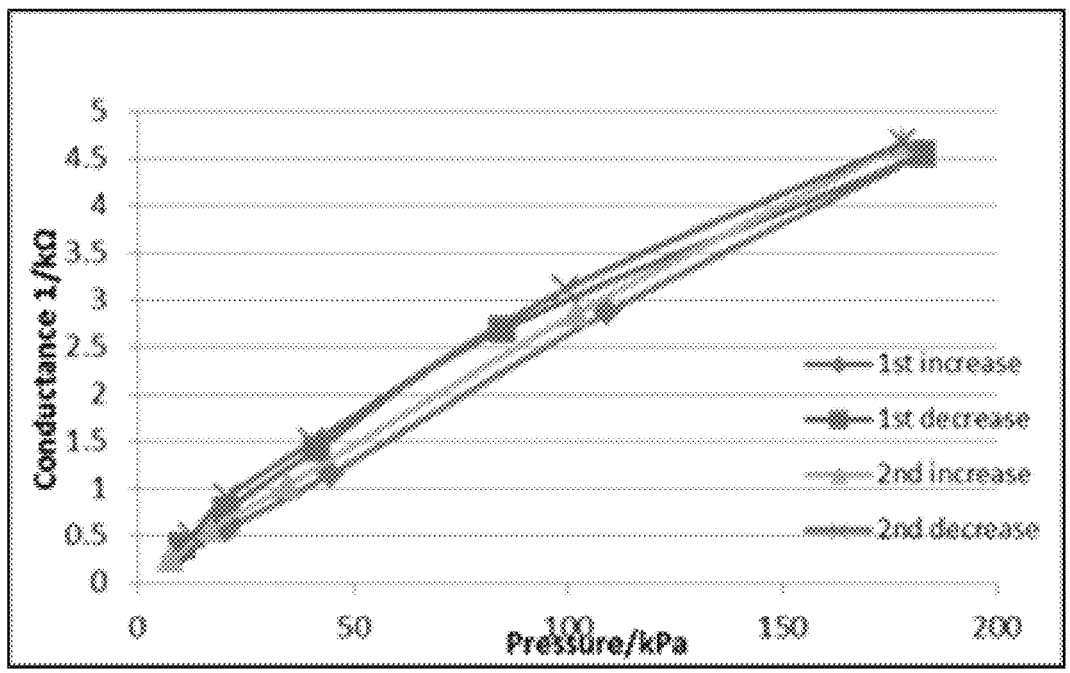
FIG. 6C shows a plot between the conductance and applied pressure on a pressure sensor made from 60 wt. % of 3,5-dimethylpyrazole blocked poly(hexamethylene diisocyanate) cross linker and 40 wt. % of poly(bisphenol A-co-epichlorohydrin) according to certain embodiments described herein.
Figure 6D:
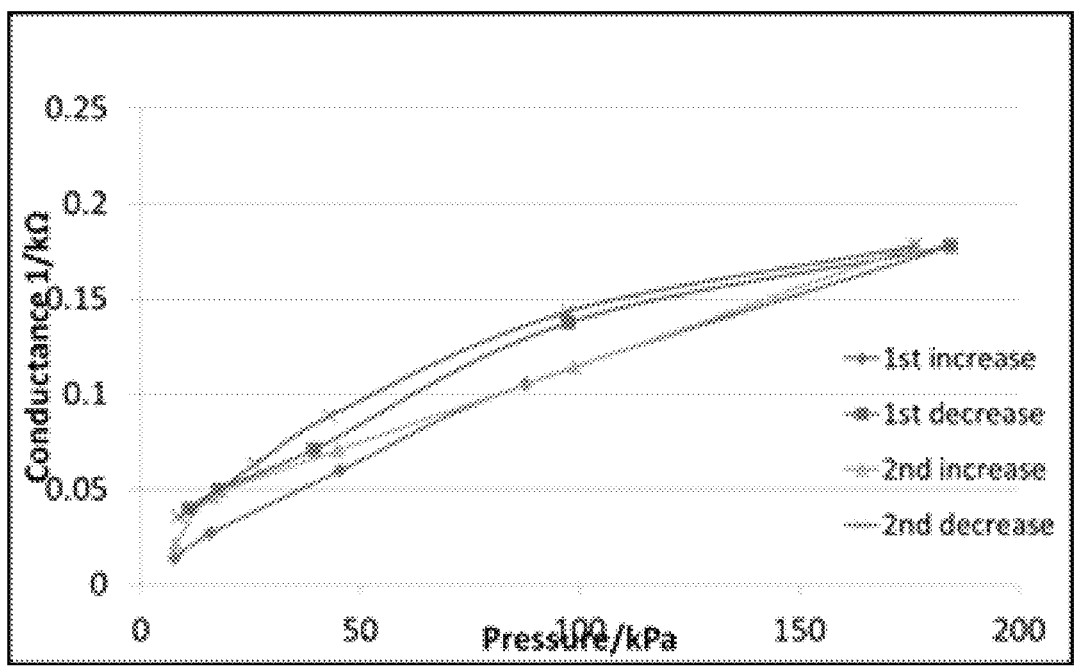
FIG. 6D shows a plot between the conductance and applied pressure on a pressure sensor made from 65 wt. % of 3,5-dimethylpyrazole blocked poly(hexamethylene diisocyanate) cross linker and 35 wt. % of poly(bisphenol A-co-epichlorohydrin) according to certain embodiments described herein.

A pressure sensor array can be fabricated in the same manner as the single pressure sensor. The pressure sensor array can comprise an upper electrode array 7 and a lower electrode array 8 (FIGS. 5A and 5B). The upper electrode array 7 and the lower electrode array 8 can be packaged face to face. Each of the upper electrode array 7 and the lower electrode array 8 can comprise an array of conductive electrode layers 9 and 10, and an array of pressure sensitive electrode layers 11 and 12. Each conductive electrode layer can be in electrical communication with each pressure sensitive electrode layer. In the upper and lower electrode arrays 7 and 8, each conductive electrode layer of the array of conductive electrode layers 9 and 10 can be connected with an electrical channel. The pressure sensor array is able to the show a pressure map for a certain measured area, whereas the conventional pressure sensors generally can only measure the pressure of a certain measure spot. The pressure sensors provided herein can also be prepared as a flexible thin film, whereas convention pressure sensors are typically much bulkier, which can create issues and impose design limitations when manufacturing pressure sensor arrays.

In addition, the single pressure sensor and the pressure sensor array as described above can maintain high sensitivity to pressure and force even after re-molding with other plastics or rubbers such as PP, PE, PET, EVA, PU, and silicone, and combinations thereof, under higher temperatures up to 230° C.

EXAMPLES

Example 1

Preparation of Blocked Crosslinking Agent 1.62 g phenol and 0.03 g stannous octoate were dissolved in 2.0 g DMF. 20 g end blocked isocyanate cross linker with average Mn of about 2,300 (Sigma-Aldrich). The end blocked isocyanate cross linker was dissolved in 100 ml acetone. The ratio of end blocked isocyanate cross linker to phenol can be accurately determined at a NCO/OH molar ratio of 1.667. The solution of the crosslinking agent was deoxygenized by bubbling with nitrogen and stirred by magnetic stirrer. Then, the solution of the crosslinking agent was added with the DMF solution containing the stannous octoate and heated at 65° C. under nitrogen for 4 hours to initiate the blocking reaction. The end blocked isocyanate cross linker was formed after the reaction was completed, and the content of the isocyanate group (—NCO) was determined by the titration method with acetone-butylamine.

Example 2

Preparation of the Paste for the Conductive Electrode Layer 4 g of 30 wt. % poly(bisphenol A-co-epichlorohydrin) (number average molecular weight 50,000 amu) in 2-butoxyethyl acetate, and 2.5 g of 500 nm or 1 μm silver particles were mixed thoroughly and then stirred under a paddle mixer for at least 1 hour to form a preliminary paste. Then, 0.62 g of KL-120, and <1 wt. % SDBS surfactant relative to the total weight of the silver particles additive was added in the preliminary paste above and stirred continuously to form a paste for the conductive electrode layer.

Example 3

Preparation of the Paste for the Pressure Sensitive Electrode Layer

Step 1: The ingredient A was obtained by mixing the following components as listed in Table 6 and then grinding using a three-roller grinding machine for no less than 10 minutes.

TABLE 6

| Component | Weight |
|---|---|
| conductive carbon black powder with the average size of 30 nm | 0.2-0.3 g |
| 30 wt. % poly(bisphenol A-co-epichlorohydrin) (number average molecular weight 50,000 amu) in 2-butoxyethyl acetate | 1.5-2.0 g |

Step 2: The final paste for the pressure sensitive electrode layer was prepared by mixing the following components as listed in Table 7 and stirring for a long time to form a uniform dispersion.

TABLE 7

| Component | Weight |
|---|---|
| Ingredient A | 0.7-0.9 g |
| 30 wt. % poly(bisphenol A-co-epichlorohydrin) (number average molecular weight 50,000 amu) in 2-butoxyethyl acetate | 3.0-4.0 g |
| KL-120 (number average molecular weight 2,000 amu) | 0.54-0.60 g |
| 48 wt % liquid rubber (e.g. hydroxyl-terminated butadiene-acrylonitrile copolymer) in 2-butoxyethyl acetate | 0.02-0.04 g |

For some applications, the pressure sensor needs to be integrated with other component by molding with other plastic or rubber materials. A single pressure sensitive device as described herein, and illustrated in FIG. 3, can be re-molded with other plastics or rubbers such as PP, PE, PET, EVA, PI PU, and silicone, under high temperatures, such as 150-230° C., 155-225° C., 160-220° C., 165-215° C., 170-210° C. 175-205° C., 180-200° C., 185-195° C., or 190° C. In certain embodiments, PI is selected as the substrate.

What is claimed is:

1. A pressure sensor composition comprising a crosslinked polymer comprising a poly(hexamethylene dicarbamoyl) cross linker and a poly(bisphenol A-co-epichlorohydrin); a conductive carbon material; and an elastomeric rubber.

2. The pressure sensor composition of claim 1, wherein the conductive carbon material is carbon black, carbon nanotubes, graphene, graphite, or a combination thereof.

3. The pressure sensor composition of claim 1, wherein the elastomeric rubber comprises polybutadiene, polyisoprene, polyacrylonitrile, and copolymers thereof.

4. The pressure sensor composition of claim 1, wherein the number average molecular weight of the poly(bisphenol A-co-epichlorohydrin) is about 20,000 amu about 70,000 amu.

5. The pressure sensor composition of claim 1, wherein the number average molecular weight of poly(hexamethylene dicarbamoyl) is about 500 amu-about 2,500 amu.

6. The pressure sensor composition of claim 1, wherein the pressure sensor composition comprises 90-95% by weight crosslinked polymer, 4-6% by weight conductive carbon material, and 0.5%-2% by weight elastomeric rubber.

7. The pressure sensor composition of claim 6, wherein the crosslinked polymer comprises poly(bisphenol A-co-epichlorohydrin) and poly(hexamethylene dicarbamoyl) cross linker in a mass ratio of 1:2 to 1:3.

8. The pressure sensor composition of claim 6, wherein the number average molecular weight of poly(hexamethylene dicarbamoyl) is about 2,000 amu-about 2,500 amu and the number average molecular weight of the poly(bisphenol A-co-epichlorohydrin) is about 45,000 55,000 amu.

9. The pressure sensor composition of claim 8, wherein the elastomeric rubber is a hydroxyl-terminated butadiene-acrylonitrile copolymer.

10. A method of preparing the pressure sensor composition of claim 1, comprising:
contacting a blocked poly(hexamethylene diisocyanate); poly(bisphenol A-co-epichlorohydrin); conductive carbon material; and elastomeric rubber thereby forming the pressure sensor of claim 1.

11. The method of claim 10, wherein the blocked poly (hexamethylene diisocyanate) is blocked with an optionally substituted phenol; an optionally substituted imidazole; or an optionally substituted pyrazole.

12. The method of claim 11 further comprising the step of contacting a poly(hexamethylene diisocyanate) with an optionally substituted phenol; an optionally substituted imidazole; or an optionally substituted pyrazole thereby forming the blocked poly(hexamethylene diisocyanate).

13. The method of claim 10, wherein the number average molecular weight of the poly(bisphenol A-co-epichlorohydrin) is 20,000 amu 70,000 amu.

14. The method of claim 10, wherein the number average molecular weight of the blocked poly(hexamethylene diisocyanate)is 500-2,500 amu.

15. The method of claim 10, wherein the mass ratio of the poly(bisphenol A-co-epichlorohydrin); the blocked poly (hexamethylene diisocyanate); the conductive carbon material; and the elastomeric rubber is 1:0.4:0.06:0.005 to 1:0.5: 0.09:0.015.

16. The method of claim 10 further comprising the step of curing the pressure sensor composition at a temperature of 110-180° C.

17. The method of claim 10, wherein the blocked poly (hexamethylene diisocyanate) is blocked with 3,5-dimethylpyrrazole and the step of contacting the 3,5-dimethylpyrazole blocked poly(hexamethylene diisocyanate); the poly (bisphenol A-co-epichlorohydrin); the conductive carbon material; and the elastomeric rubber is conducted in the presence of a metal catalyst.

18. A pressure sensor comprising the pressure sensor composition of claim 1 and an electrode.

19. The pressure sensor of claim 18, wherein the electrode is a flexible silver electrode.

20. The pressure sensor of claim 19, wherein the flexible silver electrode comprises a poly(hexamethylene dicarbamoyl) cross linker and poly(bisphenol A-co-epichlorohydrin); and silver particles.

* * * * *